United States Patent
Nie et al.

(10) Patent No.: US 11,997,153 B2
(45) Date of Patent: May 28, 2024

(54) SCREEN PROJECTION METHOD AND DEVICE

(71) Applicant: Huawei Technologies Co., Ltd., Shenzhen (CN)

(72) Inventors: Pengcheng Nie, Shenzhen (CN); Bihai Wang, Shenzhen (CN); Zequ Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 17/597,236

(22) PCT Filed: Jul. 29, 2020

(86) PCT No.: PCT/CN2020/105491
§ 371 (c)(1),
(2) Date: Dec. 29, 2021

(87) PCT Pub. No.: WO2021/018187
PCT Pub. Date: Feb. 4, 2021

(65) Prior Publication Data
US 2022/0321634 A1    Oct. 6, 2022

(30) Foreign Application Priority Data
Jul. 30, 2019 (CN) .......................... 201910694322.3

(51) Int. Cl.
*H04L 65/70* (2022.01)
*H04L 65/80* (2022.01)
*H04N 21/647* (2011.01)

(52) U.S. Cl.
CPC .............. *H04L 65/70* (2022.05); *H04L 65/80* (2013.01); *H04N 21/64769* (2013.01); *H04N 21/64792* (2013.01)

(58) Field of Classification Search
CPC ................... H04N 21/64769; H04N 21/64792
See application file for complete search history.

(56) References Cited

U.S. PATENT DOCUMENTS 9,054,911 B1 *   6/2015  Glover .................... H04L 65/00
2004/0016000 A1  1/2004  Zhang et al.
(Continued)

FOREIGN PATENT DOCUMENTS

CN    102209230 A    10/2001
CN    103338207 A    10/2013
(Continued)

OTHER PUBLICATIONS

M J Nixon, "Across Incompatible Network Routing Protocol of the Communication Network to Transmit Data Frame", May 28, 2014, CN 103828477 A (English Translation), pp. 1-112 (Year: 2014).*
(Continued)

*Primary Examiner* — Jonathan A Bui
(74) *Attorney, Agent, or Firm* — Slater Matsil, LLP

(57) ABSTRACT

A screen projection method and a device, the method including performing, by a controlling device, at least one of sending, based on a reliability transmission protocol, in response to an image frame that is to be sent being an I frame, a data packet that carries the image frame, sending, based on the reliability transmission protocol, in response to the image frame being a P frame that meets a first preset condition, the data packet that carries the image frame, or sending, based on a non-reliability transmission protocol, in response to the image frame being a P frame that does not meet the first preset condition, the data packet that carries the image frame.

19 Claims, 10 Drawing Sheets

(56) References Cited

U.S. PATENT DOCUMENTS

| | | | | |
|---|---|---|---|---|
| 2005/0021806 | A1* | 1/2005 | Richardson | H04L 47/19 |
| | | | | 348/E7.071 |
| 2006/0248216 | A1* | 11/2006 | Park | H04L 65/1101 |
| | | | | 709/231 |
| 2012/0204226 | A1* | 8/2012 | Qi | H04W 12/06 |
| | | | | 726/3 |
| 2014/0033243 | A1* | 1/2014 | Chen | H04N 21/252 |
| | | | | 725/23 |
| 2016/0063964 | A1* | 3/2016 | Verma | G06T 1/20 |
| | | | | 345/582 |
| 2018/0103233 | A1 | 4/2018 | Ramalho et al. | |
| 2018/0167592 | A1 | 6/2018 | Kusuda | |
| 2018/0279175 | A1* | 9/2018 | Gholmieh | H04L 47/6215 |
| 2018/0287850 | A1* | 10/2018 | Sosnowski | H04L 67/56 |

FOREIGN PATENT DOCUMENTS

| | | |
|---|---|---|
| CN | 103580773 A | 2/2014 |
| CN | 103716584 A | 4/2014 |
| CN | 106255230 A | 12/2016 |
| CN | 106406789 A | 2/2017 |
| CN | 106412801 A | 2/2017 |
| CN | 106792263 A | 5/2017 |
| CN | 107801088 A | 3/2018 |
| CN | 107809662 A | 3/2018 |
| CN | 107888992 A | 4/2018 |
| CN | 109150876 A | 1/2019 |
| CN | 109618170 A | 4/2019 |
| EP | 2439947 A1 | 4/2015 |
| KR | 20140115819 A | 10/2014 |
| WO | 0045581 A2 | 8/2000 |
| WO | 2011129978 A1 | 10/2011 |
| WO | 2018039179 A1 | 3/2018 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11-2016, Approved Dec. 7, 2016, 3534 pages.

"Series H: Audiovisual and Multimedia Systems Infrastructure of Audiovisual Services—Coding of Moving Video," Advanced Video Coding for Generic Audiovisual Services, ITU-T, Telecommunication Standardization Sector of ITU, H.264, Jun. 2019, 836 pages.

Wei, W., "Research on Adaptive Unequal Error Protection and Reliable Transmission of Video Data," Huazhong University of ScienceandTechnology, A Dissertation Submitted in Partial Fulfillment of the Requirements for the Degree of Master of Engineering, Apr. 2004, with English Abstract, 73 pages.

Garbiso, J. et al., "Dynamic Cluster Size Optimization in Hybrid Cellular-Vehicular Networks," 2016 IEEE 19th International Conference on Intelligent Transportation Systems (ITSC), Windsor Oceanico Hotel, Rio de Janeiro, Brazil, Dynamic Cluster Size Optimization in Hybrid Cellular-Vehicular Networks, Nov. 1-4, 2016, 7 pages.

Zaidi, S. et al., "Hybrid Error Recovery Protocol for Video Streaming in Vehicle ad hoc Netwroks," Vehicular Communications, vol. 12, XP055536076,NLISSN: 2214-2096, DOI: 10.1016/j.vehcom. 2018.01.002, Apr. 1, 2018, 17 pages.

* cited by examiner

SCREEN PROJECTION METHOD AND DEVICE

CROSS REFERENCE TO RELATED APPLICATIONS

The present application is a National Stage of International Patent Application No. PCT/CN2020/105491, filed on Jul. 29, 2020, which claims priority to Chinese Patent Application No. 201910694322.3, filed on Jul. 30, 2019. Both of the aforementioned applications are hereby incorporated by reference in their entireties.

TECHNICAL FIELD

Embodiments of this application relate to the video transmission field, and in particular, to a screen projection method and a device.

BACKGROUND

Popularization of intelligent devices and rapid development of communications technologies provide more possibilities for an interaction mode between a mobile terminal and a large screen. For example, on a site of a large business conference, a plurality of display devices may be deployed on the site to improve conference participation experience of audience. A conference presenter can project content of a mobile terminal to any display device in a conference room, to share the content displayed on the mobile terminal.

However, in a scenario in which the mobile terminal transmits a video stream to a plurality of display devices, especially when network bandwidth resources are limited, a network channel is prone to be blocked. Consequently, a frame loss and a delay of video stream transmission are caused, and a problem of poor video picture quality is caused.

SUMMARY

This application provides a screen projection method and a device, to improve video transmission quality to some extent.

To achieve the foregoing objective, the following technical solutions are used in this application.

According to a first aspect, an embodiment of this application provides a screen projection method. The method is applied to a controlling device, and may include: When a to-be-sent image frame is an I frame, the controlling device may send, based on a reliability transmission protocol, a data packet that carries the image frame; and when the to-be-sent image frame is a P frame, and when the P frame is a P frame that meets a first preset condition, the controlling device may send, based on the reliability transmission protocol, the data packet that carries the image frame; or otherwise, when the P frame is a P frame that does not meet the first preset condition, the controlling device may send, based on a non-reliability transmission protocol, the data packet that carries the image frame.

In the foregoing manner, the I frame and some P frames may be transmitted based on the reliability transmission protocol, to ensure transmission reliability of the I frame and the some P frames. In this way, a problem that video picture quality obtained after a decoding end (that is, a display device) performs decoding is relatively poor because video transmission quality is poor due to a frame loss is avoided, and user experience is effectively improved.

In a possible implementation, the first preset condition includes: determining that a preset period is met; or an inter-frame prediction parameter between the P frame and a previous image frame or a subsequent image frame is greater than or equal to a first threshold.

In the foregoing manner, a plurality of manners of selecting some P frames are proposed, in other words, a manner of selecting the P frame may be: periodically selecting the P frame, or may be: selecting the P frame based on importance of the P frame.

In a possible implementation, the screen projection system to which the controlling device includes two or more screen projection groups, and each screen projection group includes a first display device and at least one second display device. The video transmission quality of the screen projection system is determined based on average video transmission quality sent by the first display device in each group, and the average video transmission quality is determined by the first display device based on video transmission quality sent by each second display device in a screen projection group to which the first display device belongs.

In the foregoing manner, the controlling device can dynamically choose, based on video transmission quality of the system, whether to transmit the P frame by using the reliability transmission protocol, to improve video transmission quality.

In a possible implementation, a quantity of hops between each screen projection group and the controlling device is determined based on average video transmission quality of each screen projection group.

In the foregoing manner, routing relationships or routing connection relationships between screen projection groups and between the screen projection group and the controlling device may be dynamically updated based on the video transmission quality, to further optimize overall video transmission quality of the system.

In a possible implementation, a quantity of hops between the at least one second display device in each screen projection group and the first display device in the screen projection group to which the at least one second display device belongs is determined based on video transmission quality of each second display device.

In the foregoing manner, a routing relationship or a routing connection relationship between display devices in the screen projection group may be dynamically updated based on the video transmission quality, to further optimize overall video transmission quality of the system.

In a possible implementation, a quantity of first display devices serving as next-hop nodes of the controlling device is less than or equal to a third threshold, and a quantity of second display devices serving as next-hop nodes of the first display device is less than or equal to a fourth threshold.

In the foregoing manner, a problem that the controlling device and/or the display device may become a bottleneck node is effectively alleviated.

In a possible implementation, the sending, based on a reliability transmission protocol, a data packet that carries the image frame is: sending the data packet to the first display device serving as a next-hop node of the controlling device, where the data packet carries the image frame and is based on the reliability transmission protocol.

In the foregoing manner, an amount of concurrent transmission at a controlling device end is effectively reduced, and network pressure at the controlling device end is reduced.

According to a second aspect, an embodiment of this application provides a screen projection method. The method is applied to a controlling device and may include: When a to-be-sent image frame is an I frame, the controlling device may send, based on a reliability transmission protocol, a data packet that carries the image frame; and when the to-be-sent image frame is a P frame, and when video transmission quality of a screen projection system to which the controlling device belongs meets a second preset condition, the controlling device may send, based on the reliability transmission protocol, the data packet that carries the image frame; or otherwise, when the video transmission quality of the screen projection system to which the controlling device belongs does not meet the second preset condition, the controlling device may send, based on a non-reliability transmission protocol, the data packet that carries the image frame.

In the foregoing manner, when video transmission quality of the system does not reach an expectation, all P frames in an image sequence are transmitted by using a data packet that is based on the reliability transmission protocol, to reduce a frame loss ratio and improve video transmission quality. In a possible implementation, the reliability transmission protocol may use a transmission mechanism including an acknowledgment, and the non-reliability transmission protocol may use a multicast transmission mechanism.

Optionally, the multicast transmission mechanism may use a broadcast communication manner. In the foregoing manner, if the I frame and some P frames are transmitted by using the data packet that is based on the reliability transmission protocol, an acknowledgment manner of the reliability transmission protocol can ensure a success rate of transmission of a data packet that carries the I frame or the some P frames, to reduce a frame loss ratio.

In a possible implementation, the reliability transmission mechanism is a dynamic routing protocol.

In a possible implementation, the screen projection system includes two or more screen projection groups, and each screen projection group includes a first display device and at least one second display device. The video transmission quality of the screen projection system is determined based on average video transmission quality sent by the first display device in each group, and the average video transmission quality is determined by the first display device based on video transmission quality sent by each second display device in a screen projection group to which the first display device belongs.

In the foregoing manner, the controlling device can dynamically choose, based on video transmission quality of the system, whether to transmit the P frame by using the reliability transmission protocol, to improve video transmission quality.

In a possible implementation, a quantity of hops between each screen projection group and the controlling device is determined based on average video transmission quality of each screen projection group.

In the foregoing manner, routing relationships or routing connection relationships between screen projection groups and between the screen projection group and the controlling device may be dynamically updated based on the video transmission quality, to further optimize overall video transmission quality of the system.

In a possible implementation, a quantity of hops between the at least one second display device in each screen projection group and the first display device in the screen projection group to which the at least one second display device belongs is determined based on video transmission quality of each second display device.

In the foregoing manner, a routing relationship or a routing connection relationship between display devices in the screen projection group may be dynamically updated based on the video transmission quality, to further optimize overall video transmission quality of the system.

In a possible implementation, a quantity of first display devices serving as next-hop nodes of the controlling device is less than or equal to a third threshold, and a quantity of second display devices serving as next-hop nodes of the first display device is less than or equal to a fourth threshold.

In the foregoing manner, a problem that the controlling device and/or the display device may become a bottleneck node is effectively alleviated.

In a possible implementation, the sending, based on a reliability transmission protocol, a data packet that carries the image frame is: sending the data packet to the first display device serving as a next-hop node of the controlling device, where the data packet carries the image frame and is based on the reliability transmission protocol.

In the foregoing manner, an amount of concurrent transmission at a controlling device end is effectively reduced, and network pressure at the controlling device end is reduced.

In a possible implementation, if the image frame is a B frame, the controlling device may send, based on the non-reliability transmission protocol, the data packet that carries the image frame.

In the foregoing manner, the controlling device may send the B frame by using the non-reliability transmission protocol, so that a transmission delay of the image sequence is reduced.

According to a third aspect, an embodiment of this application provides a controlling device, including: a memory and a processor, where the memory and the processor are coupled. The memory includes program instructions, and when the program instructions are run by the processor, the controlling device is enabled to perform the following steps: when a to-be-sent image frame is an I frame, sending, based on a reliability transmission protocol, a data packet that carries the image frame; and when the to-be-sent image frame is a P frame, and when the P frame is a P frame that meets a first preset condition, sending, based on the reliability transmission protocol, the data packet that carries the image frame; or when the P frame is a P frame that does not meet the first preset condition, sending, based on a non-reliability transmission protocol, the data packet that carries the image frame.

In a possible implementation, the first preset condition includes: determining that a preset period is met; or an inter-frame prediction parameter between the P frame and a previous image frame or a subsequent image frame is greater than or equal to a first threshold.

According to a fourth aspect, an embodiment of this application provides a controlling device, including: a memory and a processor, where the memory and the processor are coupled. The memory includes program instructions, and when the program instructions are run by the processor, the controlling device is enabled to perform the following steps: when a to-be-sent image frame is an I frame, sending, based on a reliability transmission protocol, a data packet that carries the image frame; and when the to-be-sent image frame is a P frame, and when video transmission quality of a screen projection system to which the controlling device belongs meets a second preset condition, sending, based on the reliability transmission protocol, the data packet that carries the image frame; or when the video transmission quality of the screen projection system to which the controlling device belongs does not meet the second preset condition, sending, based on a non-reliability transmission protocol, the data packet that carries the image frame.

In a possible implementation, the reliability transmission protocol uses a transmission mechanism including an acknowledgment, and the non-reliability transmission protocol uses a multicast transmission mechanism.

In a possible implementation, the reliability transmission mechanism is a dynamic routing protocol.

In a possible implementation, the screen projection system includes two or more screen projection groups, and each screen projection group includes a first display device and at least one second display device. The video transmission quality of the screen projection system is determined based on average video transmission quality sent by the first display device in each group, and the average video transmission quality is determined by the first display device based on video transmission quality sent by each second display device in a screen projection group to which the first display device belongs.

In a possible implementation, a quantity of hops between each screen projection group and the controlling device is determined based on average video transmission quality of each screen projection group.

In a possible implementation, a quantity of hops between the at least one second display device in each screen projection group and the first display device in the screen projection group to which the at least one second display device belongs is determined based on video transmission quality of each second display device.

In a possible implementation, a quantity of first display devices serving as next-hop nodes of the controlling device is less than or equal to a third threshold, and a quantity of second display devices serving as next-hop nodes of the first display device is less than or equal to a fourth threshold.

In a possible implementation, the sending, based on the reliability transmission protocol, a data packet that carries the image frame is: sending the data packet to the first display device serving as a next-hop node of the controlling device.

In a possible implementation, when the program instructions are run by the processor, the controlling device is enabled to perform the following step: if the image frame is a B frame, sending, based on the non-reliability transmission protocol, the data packet that carries the image frame.

According to a fifth aspect, an embodiment of this application provides a computer-readable medium, configured to store a computer program. The computer program includes instructions used to perform the method according to any one of the first aspect or the possible implementations of the first aspect.

According to a sixth aspect, an embodiment of this application provides a computer-readable medium, configured to store a computer program. The computer program includes instructions used to perform the method according to any one of the second aspect or the possible implementations of the second aspect.

According to a seventh aspect, an embodiment of this application provides a computer program. The computer program includes instructions used to perform the method according to any one of the first aspect or the possible implementations of the first aspect.

According to an eighth aspect, an embodiment of this application provides a computer program. The computer program includes instructions used to perform the method according to any one of the second aspect or the possible implementations of the second aspect.

According to a ninth aspect, an embodiment of this application provides a chip. The chip includes a processing circuit and a transceiver pin. The transceiver pin and the processor communicate with each other through an internal connection path. The processor performs the method according to any one of the first aspect or the possible implementations of the first aspect, to control a receive pin to receive a signal, and to control a transmit pin to send a signal.

According to a tenth aspect, an embodiment of this application provides a chip. The chip includes a processing circuit and a transceiver pin. The transceiver pin and the processor communicate with each other through an internal connection path. The processor performs the method according to any one of the second aspect or the possible implementations of the second aspect, to control a receive pin to receive a signal, and control a transmit pin to send a signal.

According to an eleventh aspect, an embodiment of this application provides a screen projection system, and the system includes the controlling device and at least one display device (including the first display device and the second display device) in the first aspect.

DETAILED DESCRIPTION OF ILLUSTRATIVE EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship between objects and represents that three relationships may exist. For example, A and/or B may represent the following three cases: Only A exists, both A and B exist, and only B exists.

In the specification and claims in the embodiments of this application, the terms "first", "second", and the like are intended to distinguish between different objects but do not indicate a particular order of the objects. For example, a first target object, a second target object, and the like are intended to distinguish between different target objects but do not indicate a particular order of the target objects.

In the embodiments of this application, the term "example" or "for example" is used to represent giving an example, an illustration, or a description. Any embodiment or design scheme described as an "example" or with "for example" in the embodiments of this application should not be explained as being more preferred or having more advantages than another embodiment or design scheme. Exactly, use of the term such as "example" or "for example" is intended to present a related concept in a specific manner.

In the description of the embodiments of this application, unless otherwise stated, "a plurality of" means two or more than two. For example, a plurality of processing units are two or more processing units. A plurality of systems are two or more systems.

Figure 1:
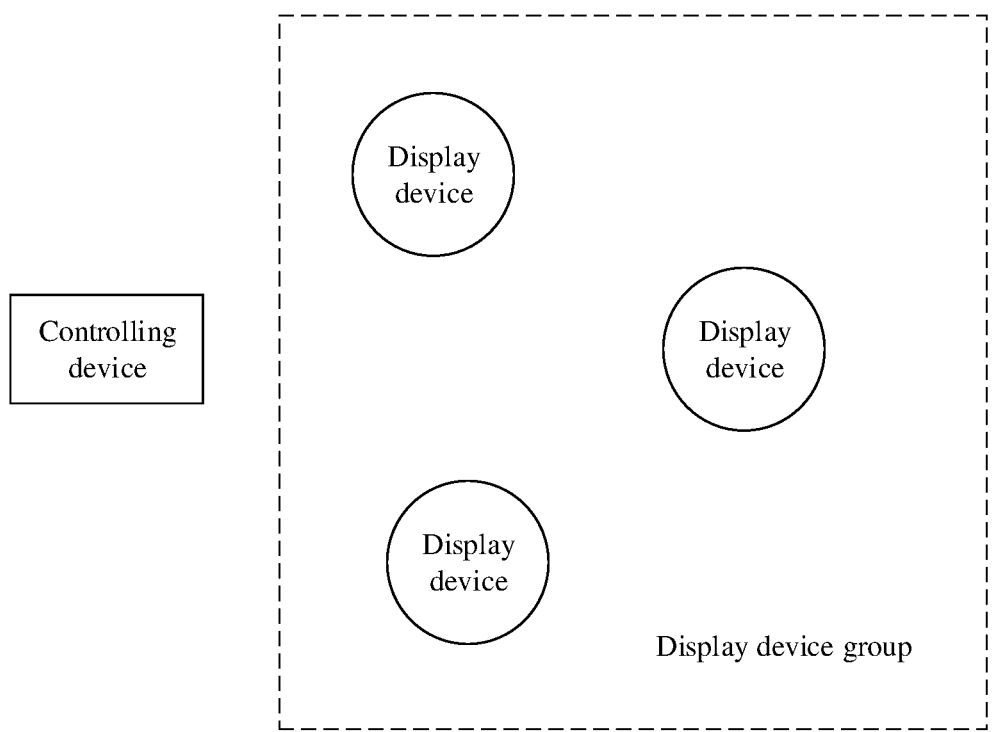
FIG. 1 is a schematic diagram of an example of an application scenario.

Before the technical solutions in the embodiments of this application are described, an application scenario of the embodiments of this application is first described with reference to the accompanying drawings. FIG. 1 is a schematic diagram of an application scenario according to an embodiment of this application. The application scenario includes a controlling device and a display device group, and the display device group includes two or more display devices. In a specific implementation process of this embodiment of this application, the controlling device may be a device such as a computer, a smartphone, a tablet computer, or a smartwatch. The display device may be a device that has a display screen and that can be used for decoding, such as a smart television, a smartphone, a computer, or a tablet computer. It should be noted that a quantity of controlling devices and a quantity of display devices in the application scenario shown in FIG. 1 are merely adaptive examples, and are not limited in this application.

A specific implementation solution of this application is described below with reference to the schematic diagram of the application scenario shown in FIG. 1.

In this application, when projecting a screen to one or more display devices in a display device group, the controlling device may determine, based on a frame type of a to-be-sent image frame in an image sequence, a transmission type of a data packet that carries the image frame. Optionally, if the image frame is an I frame, the transmission type of the data packet is a reliability transmission protocol, and if the image frame is a P frame, the controlling device may further determine, based on a preset condition, whether a data packet that carries the P frame needs to be transmitted based on the reliability transmission protocol. Optionally, in this application, a P frame that needs to be transmitted based on the reliability transmission protocol may be referred to as a high-priority P frame, and a P frame that does not need to be transmitted based on the reliability transmission protocol may be referred to as a non-high-priority P frame or a low-priority P frame.

In an example, a data packet of the I frame and a data packet of the high-priority P frame are transmitted based on the reliability transmission protocol. The controlling device may send, to a display device serving as a next hop of the controlling device, a data packet that carries the I frame and/or the high-priority P frame, and the next-hop display device forwards the data packet based on a routing path.

In another example, a data packet of the low-priority P frame and/or a data packet of the B frame may be transmitted based on a non-reliability transmission protocol. The controlling device may broadcast, to each display device in the display device group, a packet that carries the low-priority P frame and/or the B frame.

To enable a person in the art to better understand implementation solutions of this application, detailed descriptions are provided below by using a specific embodiment.

With reference to FIG. 1, optionally, in this application, before the controlling device initiates screen projection to a plurality of display devices, a plurality of display devices in the display device group may be grouped in advance, and a display device serving as a group leader (another device is a group member) is selected for each group.

Specifically, in this application, for a display device group (including two or more display devices) in an area, one display device may be randomly selected as a coordinate origin (referred to as an origin display device for short below). The origin display device may obtain a location parameter between another display device in the display device group and the origin display device, and the location parameter includes but is not limited to a direction and a distance. Then, N screen projection groups may be constructed based on the location parameter and a specified algorithm. Optionally, the specified algorithm may be a k-means clustering algorithm (k-means clustering algorithm, K-mean for short). Optionally, N may be an integer greater than or equal to 1, and is not limited in this application. For a specific manner of constructing the screen projection group, refer to an existing technology. Details are not described in this application.

Then, the controlling device goes online, and releases an event that the controlling device goes online to the display device group. Optionally, the controlling device may release the online event through broadcasting.

Optionally, each display device receives a broadcast signal of the controlling device, and each display device may obtain a signal strength parameter based on the broadcast signal. For a manner of obtaining the signal strength parameter, refer to the existing technology. Details are not described in this application.

Optionally, each display device may send the signal strength parameter to the controlling device, and the controlling device may elect a group leader of each screen projection group based on the signal strength parameter. Specifically, the controlling device may select a display device with a maximum signal strength parameter in the screen projection group as a group leader, and another display device in the group is a group member.

Optionally, each display device may further broadcast the obtained signal strength parameter. Correspondingly, each display device receives a signal strength parameter broadcast by another display device. Then, the display device in each screen projection group may elect the group leader based on the received signal strength parameter. For example, a signal strength parameter of a display device 1 is signal strength A, a signal strength parameter of a display device 2 is signal strength B, and a signal strength parameter of a display device 3 is signal strength C. The signal strength A>the signal strength B>the signal strength C. The display device 1, the display device 2, and the display device 3 belong to a same screen projection group. Then, the display device 1, the display device 2, and the display device 3 broadcast respective signal strength parameters. The display device 1 is used as an example. The display device 1 receives the signal strength B sent by the display device 2 and the signal strength C sent by the display device 3. The display device 1 compares the signal strength A of the display device 1 with the received signal strength parameters, and determines that the display device 1 is a device with a maximum signal strength parameter. Therefore, the display device 1 may determine the display device 1 as a group leader.

Figure 2:
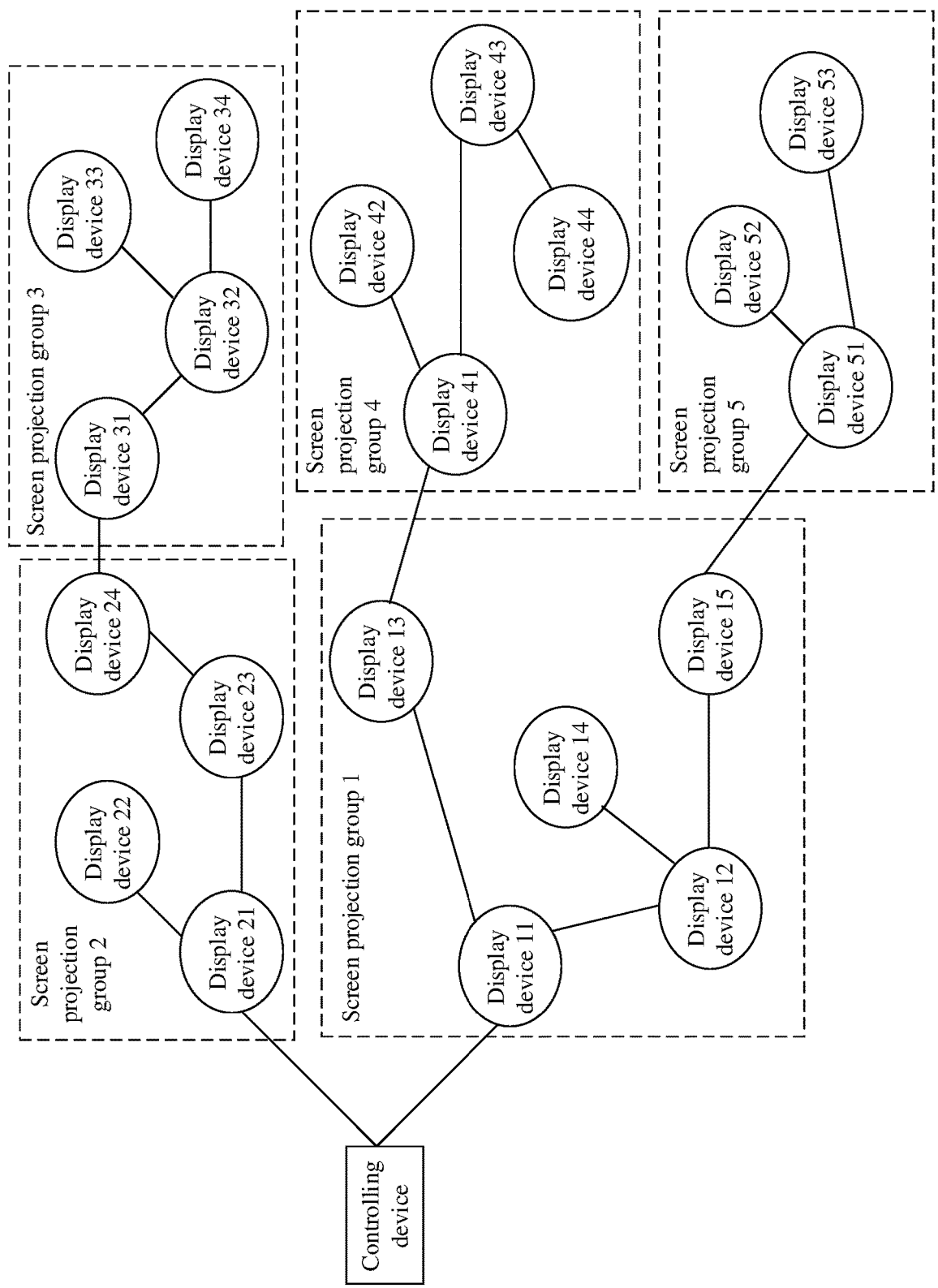
FIG. 2 is a schematic connection diagram of a network topology according to an embodiment of this application.

Then, a network routing topology is constructed. Optionally, the network routing topology may be constructed based on a routing protocol, to form a communication link between routing nodes (namely, display devices). A network topology structure shown in FIG. 2 is merely an example. It should be noted that a connection relationship shown in FIG. 2 is merely a schematic representation of a communication relationship between routing nodes. For example, a display device 11 and a display device 21 are next-hop nodes (which may alternatively be referred to as routing nodes or node devices) of the controlling device. The display device 31 is a next-hop node of a member (a display device 24) in a screen projection group 2. It should be further noted that, in a transmission mechanism based on a dynamic routing protocol, a group leader in each screen projection group is configured to receive data outside the group, and the data includes data sent by the controlling device or data sent by a display device in another group. Then, the group leader forwards the received data in the group based on the routing protocol.

Optionally, in the network topology, a maximum quantity of connections between the controlling device and each group leader is less than or equal to m. A value of m may be set based on an actual requirement. In an example, a quantity of display devices serving as next-hop nodes of the controlling device is less than or equal to 2. In another example, a quantity of display devices serving as next-hop nodes of the group leader is less than or equal to 2. For example, in the network topology shown in FIG. 2, m is 2; in other words, the controlling device has a maximum of two next-hop nodes, and each group leader has a maximum of two next-hop nodes. Therefore, an amount of concurrent transmission of data packet forwarding of the controlling device and/or the group leader is effectively reduced, and network pressure of the controlling device and/or a group leader end is alleviated. It should be noted that a next-hop node of the controlling device can only be a group leader. Optionally, the group leader serving as the next-hop node of the controlling device may be a display device with relatively poor signal strength in a plurality of group leaders, to improve transmission quality of the group leader by reducing a quantity of connection hops (or forwarding hops) between the group leader and the controlling device.

After the network topology is successfully constructed, the controlling device may initiate a screen projection procedure. Specifically, in this application, the controlling device may determine, based on a type of the image frame, a transmission mechanism corresponding to the image frame. The type of the image frame may include an intra frame (I frame) and a forward predictive frame (P frame). Optionally, the type of the image frame may further include a bi-directional predicted encoding image B frame. The I frame is a basic frame (a first frame) of a group of pictures (group of pictures, GOP), and there is only one I frame in the GOP. The I frame is a reference frame of the P frame and the B frame. There are generally a plurality of P frames in one GOP. The P frame may be a frame adjacent to the I frame, or may be an encoding frame that is separated by one to two frames after the I frame. The P frame needs to be encoded with reference to a previous frame, and represents a difference between a picture of a current frame and a previous frame (the previous frame may be an I frame or a P frame). In addition, the B frame is predicted by using a previous I or P frame and a subsequent P frame; in other words, the B frame records a difference between the current frame and a previous frame or a subsequent frame. To be specific, if the frame B needs to be decoded, not only a previous buffered picture needs to be obtained, but a subsequent picture also needs to be decoded, and a final picture is obtained by superimposing a previous picture, a subsequent picture, and data of the current frame.

Optionally, in this application, the I frame may be transmitted based on a reliability transmission mechanism, the B frame may be transmitted based on a non-reliability transmission mechanism, some P frames (which may alternatively be referred to as high-priority P frames) may be transmitted based on the reliability transmission mechanism, and another P frame (which may alternatively be referred to as a non-high-priority P frame or a low-priority P frame) may be transmitted based on the non-reliability transmission mechanism. Optionally, in this application, the reliability transmission mechanism means a transmission mechanism including an acknowledgment. To be specific, after receiving a data packet that is based on the reliability transmission mechanism, a peer end (namely, a receive end) needs to feed back an acknowledgement, so that a transmit end determines that the data packet is successfully sent, and re-sends the data packet after the acknowledgment is not received (or a negative acknowledgment is received). In this way, it can be ensured that the receive end successfully receives the data packet. Optionally, the reliability transmission mechanism may be a transmission mechanism based on a dynamic routing protocol (which may alternatively be referred to as a multi-hop dynamic routing protocol) (referred to as a dynamic routing transmission mechanism for short below). Optionally, the non-reliability transmission mechanism may be a transmission mechanism based on multicast communication (which may alternatively be referred to as multicast communication) (referred to as a multicast transmission mechanism for short below). In other words, a data packet is sent through broadcasting.

Optionally, in this application, some P frames may be selected in three manners. In one manner, some P frames (or high-priority P frames) are determined based on a network environment. For a specific embodiment, refer to a scenario 1. In another manner, a P frame is periodically selected as a high-priority P frame. For a specific embodiment, refer to a scenario 2. In still another manner, a high-priority P frame is selected based on a feature of the P frame. For a specific embodiment, refer to a scenario 3.

Figure 3:
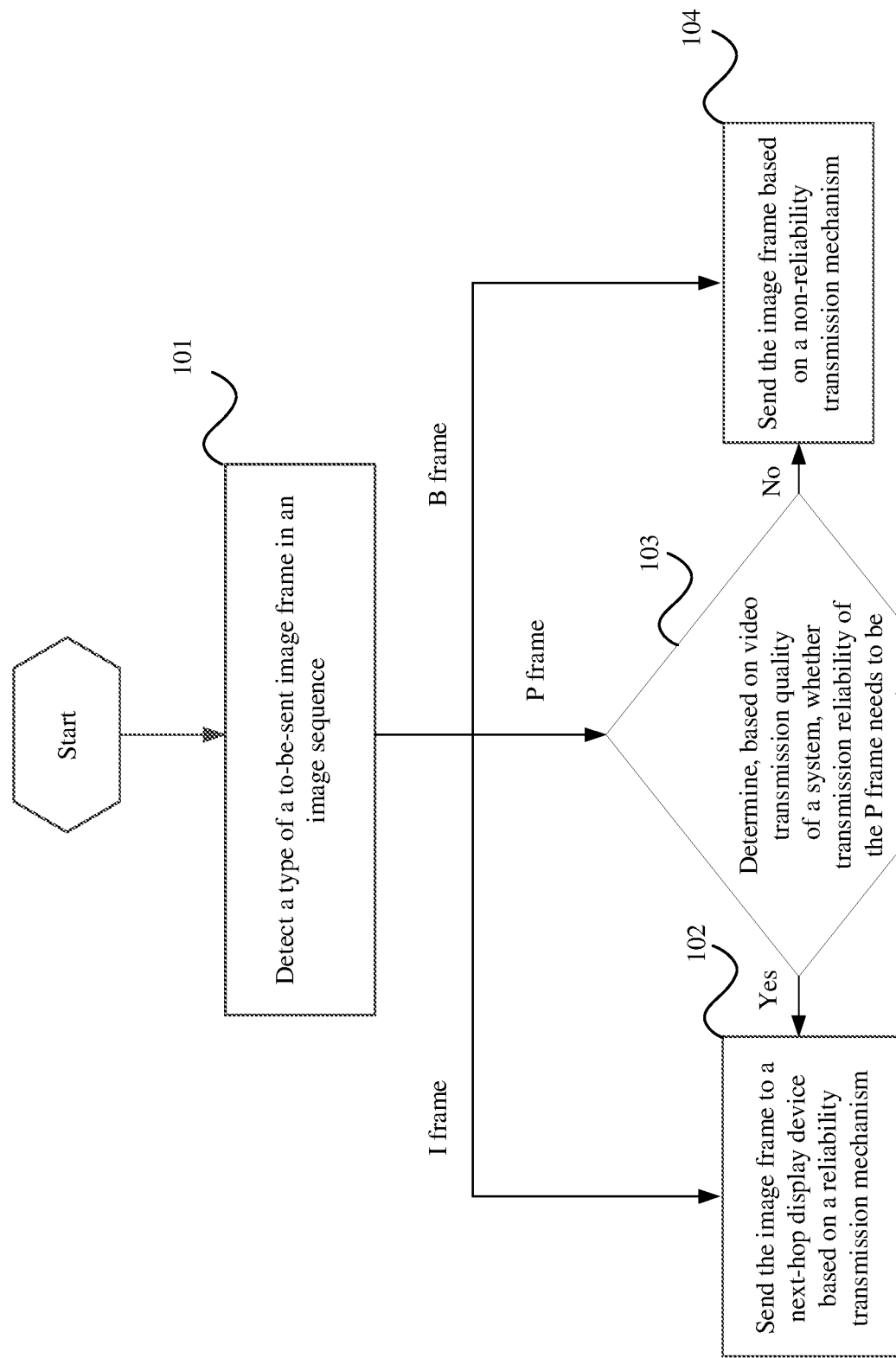
FIG. 3 is a schematic flowchart of a screen projection method according to an embodiment of this application.

Scenario 1:

With reference to FIG. 1 and FIG. 2, FIG. 3 is a schematic flowchart of a screen projection method according to an embodiment of this application. In FIG. 3:

Step 101: Detect a type of a to-be-sent image frame in an image sequence.

Specifically, in this application, a controlling device detects the to-be-sent image frame in the image sequence, namely, a type of a first image (or frame) in the image sequence. It should be noted that the image sequence in this application may be a GOP, a segment of bitstream, or the like. This is not limited in this application.

Optionally, if the controlling device detects that the to-be-sent image frame is an I frame, step 102 is performed.

Optionally, if the controlling device detects that the to-be-sent image frame is a P frame, step 103 is performed.

Optionally, if the controlling device detects that the to-be-sent image frame is a B frame, step 104 is performed.

Step 102: Send the image frame to a next-hop display device based on a reliability transmission mechanism.

Optionally, the controlling device may encapsulate the to-be-sent image frame based on the reliability transmission mechanism, and send, to a display device serving as a next hop of the controlling device, a data packet that carries the image frame. It should be noted that the image frame carried in the data packet in this application is an image frame obtained after an original image is encoded. Correspondingly, after receiving the image frame, the display device may decode the image frame, to obtain a corresponding encoded image that may also be referred to as encoded data, and display the decoded image.

In an example, if the image frame is an I frame, the controlling device sends a dynamic routing data packet (a data packet transmitted based on a dynamic routing protocol) that carries the I frame. In another example, if the image frame is a high-priority P frame, the controlling device sends a dynamic routing data packet that carries the P frame.

When the display device is connected to a next-hop display device, and receives a data packet transmitted based on a reliability transmission protocol, the display device sends the data packet to the next-hop display device based on the reliability transmission protocol. In addition, the display device decodes the image frame, and displays the decoded image frame. For example, as shown in FIG. 2, the controlling device sends, to a next-hop display device 21 and a next-hop display device 11 based on the reliability transmission mechanism, a data packet that carries a image frame; the display device 11 sends, to a next-hop display device 12 and a next-hop display device 13 of the display device 11 based on the reliability transmission mechanism, the data packet that carries the image frame; the display device 13 sends, to a next-hop display device 41 of the display device 13 based on the reliability transmission mechanism, the data packet that carries the image frame; and the display device 12 sends, to a display device 14 and a display device 15 based on the reliability transmission mechanism, the data packet that carries the image frame. Similarly, the data packet is transmitted to display devices in screen projection groups 4 and 5 based on the reliability transmission mechanism. The data packet is also sent to a display device in a screen projection group 3 based on the reliability transmission mechanism.

Optionally, in this application, if there are two or more consecutive image frames, it is determined that transmission needs to be performed based on the reliability transmission protocol. A plurality of image frames may be carried in a same data packet. It should be noted that a quantity of image frames that may be included in the data packet is determined by a carrying capability of the data packet and a size of encoded data of the image frame. In an example, if a volume of the I frame is greater than a carrying capability of one dynamic routing data packet, the I frame may be split and carried in different data packets for transmission. In another example, if a total volume of two consecutive high-priority P frames is less than a carrying capability of one dynamic routing data packet, the two consecutive high-priority P frames may be carried in a same dynamic routing packet as a P frame group for transmission. For a specific manner of generating the data packet, refer to an existing technology. Details are not described in this application.

Step 103: Determine, based on video transmission quality of a system, whether transmission reliability of the P frame needs to be ensured.

Optionally, the controlling device may obtain the video transmission quality of the system, and determine, based on the obtained video transmission quality of the system, whether the transmission reliability of the P frame needs to be ensured, in other words, whether the P frame needs to be transmitted based on the reliability transmission mechanism. Optionally, if the controlling device detects that the video transmission quality of the current system is less than or equal to a threshold (the threshold may be set based on an actual situation), in other words, the video transmission quality of the system does not reach an expected value, the controlling device determines that the P frame needs to be transmitted based on the reliability transmission mechanism, determines that the P frame is the high-priority P frame, and performs step 102. On the contrary, if the video transmission quality of the current system of the controlling device is greater than the threshold, in other words, the video transmission quality of the system reaches the expected value, the controlling device determines that the P frame may be transmitted based on a non-reliability transmission mechanism and that the P frame is a non-high-priority (or referred to as low-priority) P frame, and performs step 104.

Step 104: Send the image frame based on the non-reliability transmission mechanism.

Optionally, the controlling device may encapsulate the to-be-sent image frame based on the non-reliability transmission mechanism, and send a data packet that carries the image frame.

In an example, if the image frame is a non-high-priority P frame, the controlling device sends a multicast data packet (a data packet based on a multicast transmission mechanism) that carries the P frame. In another example, if the image frame is a B frame, the controlling device sends a multicast data packet that carries the B frame. When the image frame is sent based on the non-reliability transmission mechanism, the image frame may not need to be forwarded hop by hop, for example, the controlling device multicasts a data packet. All display devices receive the data packet that is multicast by the controlling device, decode the image frame, and display the decoded image frame.

Optionally, in this application, a plurality of consecutive non-high-priority P frames may be carried in a same data packet as a frame group, or a plurality of consecutive B frames and the non-high-priority P frame may be carried in a same data packet as a frame group. It should be noted that a quantity of image frames that may be included in the data packet is determined by a carrying capability of the data packet and a size of encoded data of the image frame. For a specific manner of generating the data packet, refer to the existing technology. Details are not described in this application.

Optionally, in this application, one high-priority P frame and one non-high-priority P frame may be carried in a same data packet as a frame group. If the data packet may be sent based on a transmission mechanism for a frame with a high transmission reliability requirement, the data packet is sent based on the reliability transmission mechanism. Similarly, one I frame and one non-high-priority P frame or one B frame are carried in a same data packet, and the data packet may be sent based on the reliability transmission mechanism. For example, the controlling device determines that the current to-be-sent image frame is a high-priority P frame, and a plurality of consecutive frames adjacent to the high-priority P frame include one B frame and one low-priority P frame. If a size of the high-priority P frame and the plurality of adjacent and consecutive frames does not exceed a carrying capability of the data packet, the high-priority P frame, one B frame, and one low-priority P frame may be used as a frame group and carried in a same data packet. In this way, a data packet interaction amount in the system is reduced, and network and resource pressure is correspondingly reduced.

The following describes in detail a manner in which the controlling device determines, based on the video transmission quality of the system, whether the P frame is a high-priority P frame.

Figure 4:
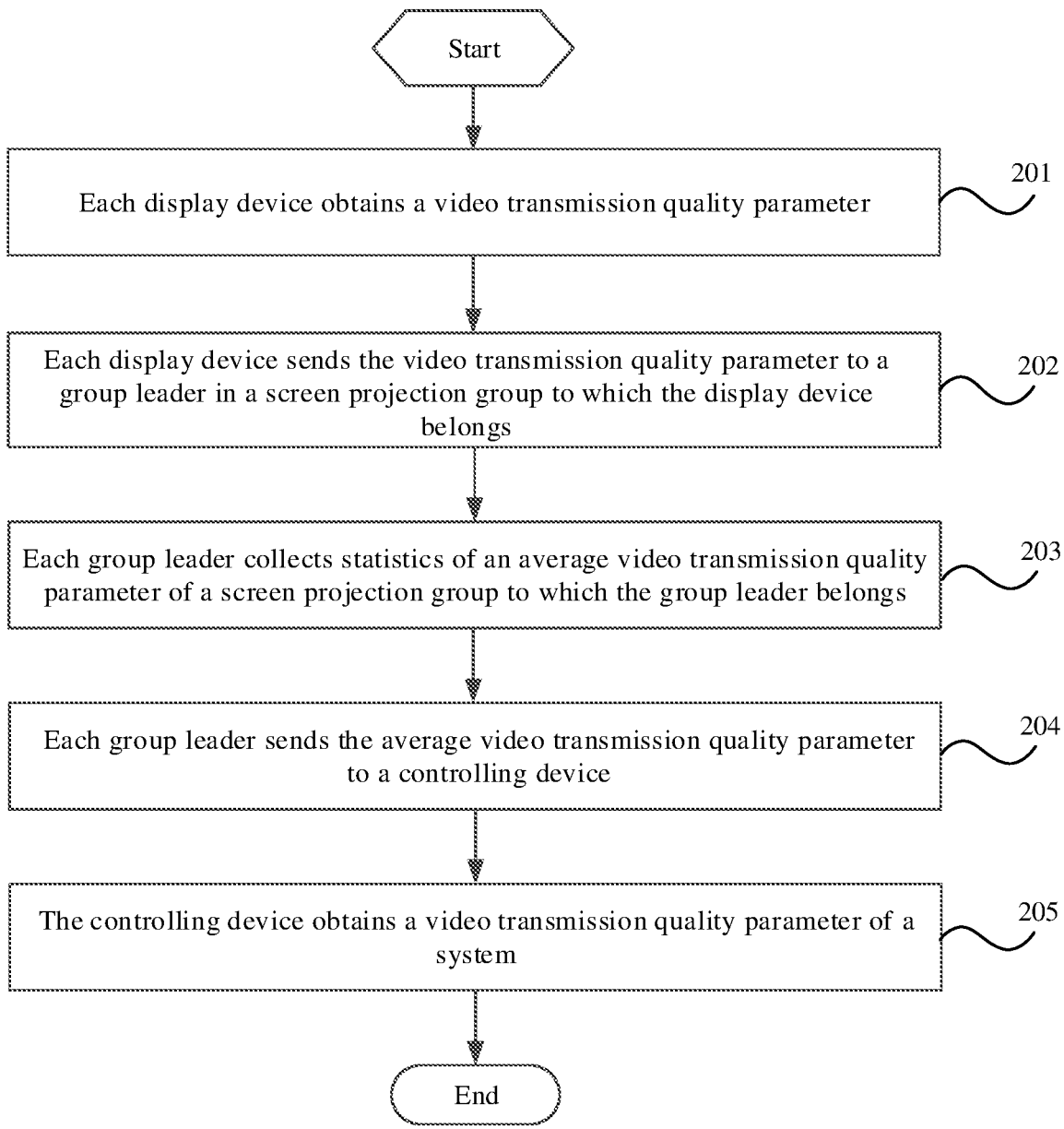
FIG. 4 is a schematic flowchart of a video transmission quality obtaining method according to an embodiment of this application.

First, the controlling device needs to obtain the video transmission quality of the system. Specifically, with reference to FIG. 1 and FIG. 2, a method used by the controlling device to monitor network environment quality (which may alternatively be referred to as video transmission quality or network transmission quality) may be shown in FIG. 4. In FIG. 4:

Step 201: Each display device obtains a video transmission quality parameter.

Specifically, in this application, the controlling device may periodically start a network environment quality monitoring procedure, and duration of a period may be set based on an actual requirement. Optionally, a parameter (namely, the video transmission quality parameter) used to indicate video transmission quality includes but is not limited to a transmission delay Tr and/or a frame loss ratio Dr.

In an example, the controlling device may add, at a period triggering moment, a timestamp to any image frame carried in a to-be-sent data packet. Subsequently, each display device may calculate a transmission delay Tr between the display device and the controlling device based on time at which the data packet is received and the timestamp. In another example, each display device may collect statistics of a frame loss ratio Dr of each display device based on a receiving status of a data frame in the period. Calculation of the delay and the frame loss ratio in the foregoing examples is merely an example. For a manner of calculating the transmission delay Tr and the frame loss ratio Dr, further refer to an existing technology. Details are not described in this application.

Step 202: Each display device sends the video transmission quality parameter to a group leader in a screen projection group to which the display device belongs.

Optionally, in this application, each display device may send the obtained video transmission quality parameter such as Tr and/or Dr to a display device serving as the group leader in the screen projection group to which the display device belongs.

Step 203: Each group leader collects statistics of an average video transmission quality parameter of a screen projection group to which the group leader belongs.

Optionally, in this application, after receiving a video transmission quality parameter sent by a group member (that is, the display device), each group leader may calculate the average video transmission quality parameter of the screen group to which the group leader belongs, for example, an average transmission delay Tr_Group and/or an average frame loss ratio Dr_Group.

Figure 5:
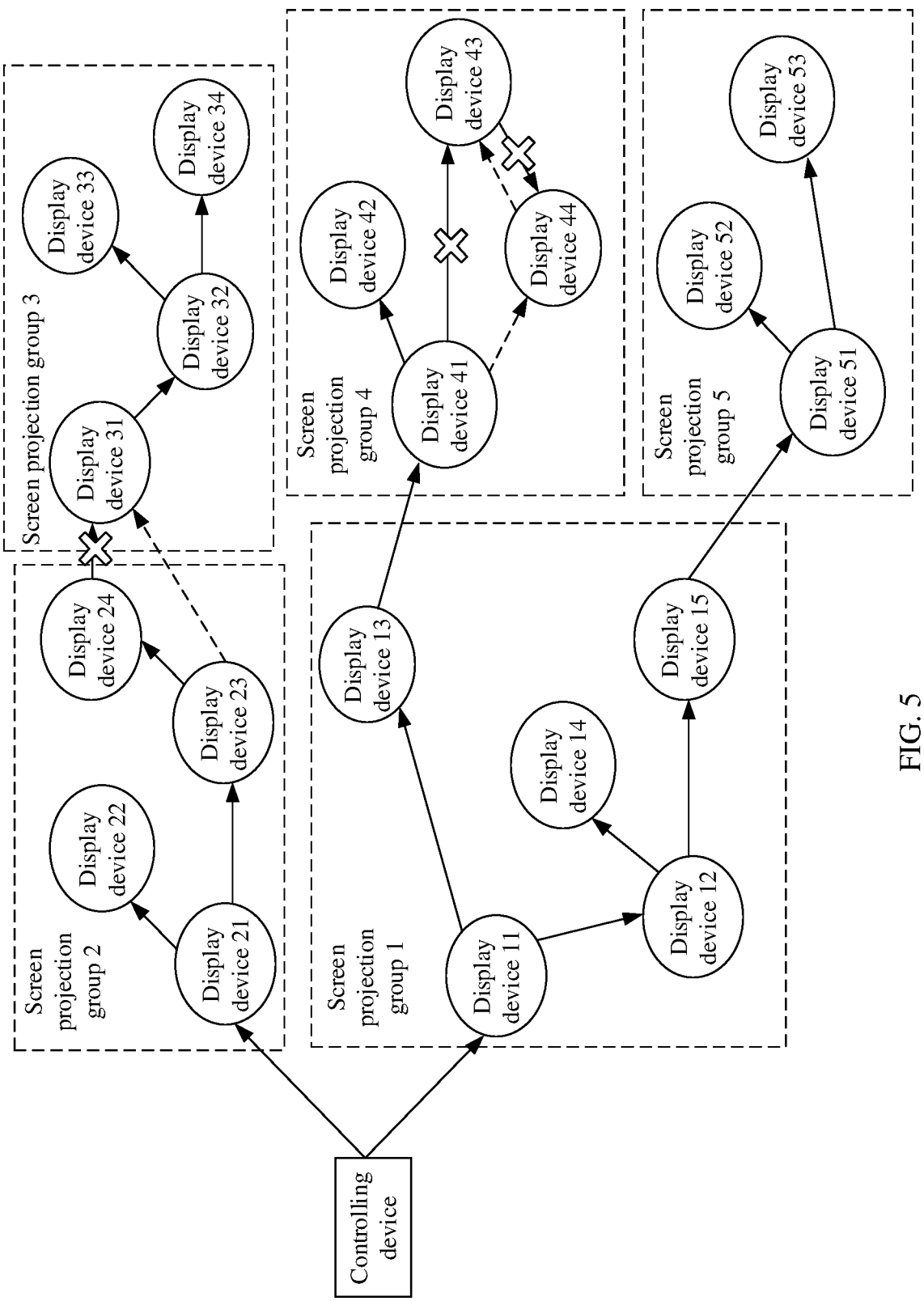
FIG. 5 is a schematic connection diagram of a network topology according to an embodiment of this application.

Optionally, the group leader may further determine video transmission quality of each member based on the video transmission quality parameter, and dynamically adjust a network route (which may alternatively be referred to as a network routing topology or a wireless connection relationship) in the group. Specifically, the group leader may subtract 1 from a quantity of hops between a display device with worst video transmission quality in the group and the group leader. If there is a display device that does not report a video transmission quality parameter, it is determined that the device is the display device with the worst video transmission quality. Optionally, if a quantity of connections of the group leader is greater than m after the network route is adjusted, the group leader may increase, by 1, a quantity of hops of a display device with best video transmission quality in next hops of the group leader. For example, as shown in FIG. 5, if a video transmission quality parameter of a display device 43 in a screen projection group 4 exceeds a threshold, a quantity of hops between the display device 43 and a group leader (a display device 41) is subtracted by 1, and after adjustment, the display device 43 is a next-hop node device of the group leader, and a display device 42 and a display device 44 are also next-hop nodes of the group leader, and in this case, a quantity of connections of the group leader is greater than a preset threshold (m=2). Therefore, the group leader increases, by 1, a quantity of hops of a display device (the display device 44 in the figure) with best video transmission quality in display devices connected to the group leader (the connection herein may be a wireless communications connection).

Step 204: Each group leader sends the average video transmission quality parameter to the controlling device.

Optionally, the group leader may send the average video transmission quality parameter through broadcasting or unicasting. This is not limited in this application.

Step 205: The controlling device obtains a video transmission quality parameter of a system.

Specifically, in this application, the controlling device receives an average video transmission quality parameter (including the average transmission delay Tr_Group and/or the average frame loss ratio Dr_Group) that is of each screen projection group and that is sent by a group leader of each group. Then, the controlling device may calculate the video transmission quality parameter of the system based on a plurality of received average video transmission quality parameters, and the video transmission quality parameter of the system includes but is not limited to a transmission delay Tr_total of the system and/or a frame loss ratio Dr_total of the system. For a specific calculation manner, refer to the existing technology, for example, averaging. Details are not described in this application.

Optionally, the controlling device may determine average video transmission quality of each group based on the average video transmission quality parameter of each group, and adjust a network route between groups. Specifically, after obtaining the average video transmission quality parameter (including Tr_Group and/or Dr_Group) of each group, the controlling device may dynamically adjust the network route between groups. Optionally, similar to dynamic adjustment of a route in a group, an adjustment rule may be: The controlling device may subtract 1 from a quantity of hops of a group with worst video transmission quality in the groups (specifically, 1 is subtracted from a quantity of hops of a group leader). If there is a group leader that does not report a video transmission quality parameter, it is determined that the group is a screen projection group with the worst video transmission quality. Optionally, if a quantity of connections of the controlling device or any group leader is greater than m after the network route is adjusted, the controlling device and/or the group leader may increase, by 1, a quantity of hops of a display device with best video transmission quality in next hops of the controlling device and/or the group leader. For example, still referring to FIG. 5, if a video transmission quality parameter of a screen projection group 3 exceeds a threshold, the controlling device determines that video transmission quality of the screen projection group 3 is relatively good. The controlling device may subtract 1 from a quantity of hops of the screen projection group 3 (that is, a display device 31 serving as a group leader), and a display device 31 is connected to a display device 23 in a screen projection group 2.

Still referring to FIG. 3, in this application, the controlling device may determine, based on the obtained video transmission quality of the system, whether a to-be-sent P frame is a high-priority P frame. Optionally, in this application, if the video transmission quality parameter such as the delay or the frame loss ratio is greater than or equal to the threshold, it is determined that video transmission quality of the current system is poor. The controlling device may select all to-be-sent P frames in an image sequence as high-priority P frames. In other words, in step 102, the controlling device transmits all the to-be-sent P frames in the image sequence based on a reliability transmission mechanism (for example, a dynamic routing protocol), to ensure transmission reliability of the P frames. In this way, a decoding error of a video data frame is reduced, and a current decoding error is corrected.

Optionally, in this application, as described above, the controlling device may periodically obtain the video transmission quality of the system. Correspondingly, if a video transmission quality parameter of the system that is obtained next time is less than the threshold, it may be determined that the video transmission quality of the system reaches an expected value, and the to-be-sent P frame in the image sequence may be selected as a non-high-priority (or low-priority) P frame, and may be transmitted based on a multicast transmission mechanism; in other words, all frames (a B frame and a P frame) other than the I frame are transmitted based on the multicast transmission mechanism, to reduce network pressure and the transmission delay of the system.

Optionally, in this application, after receiving a data packet of a non-reliability routing protocol, the display device may not forward the data packet any longer. Optionally, in this application, after receiving a data packet of a non-reliability routing protocol, the display device may alternatively forward the data packet. For example, if the video transmission quality of the system is relatively poor, in other words, any video transmission quality parameter (the delay or the frame loss ratio) of the system is greater than or equal to the threshold, each display device may forward, between devices by using a wireless connection relationship (namely, a route connection relationship) between display devices, a multicast data packet (a data packet transmitted based on the multicast transmission mechanism) that is from the controlling device and that carries the B frame and/or the P frame. In other words, after receiving the multicast data packet, the display device encapsulates data (the image frame) into a dynamic routing data packet (a data packet transmitted based on a dynamic routing transmission mechanism), and forwards the data packet based on a dynamic routing protocol. For example, still referring to FIG. 2, after receiving the data packet that carries the P frame and that is broadcast by the controlling device, the display device 11 may re-encapsulate the data packet based on the dynamic routing protocol, and forward the re-encapsulated data packet that carries the P frame to the display device 12. It should be noted that the display device 12 also receives the data packet that is broadcast by the controlling device, so that a connection relationship between display devices is fully used, a frame loss ratio of multicast communication is reduced by sharing image frames received by the display devices, and video transmission quality is improved to some extent.

Figure 6:
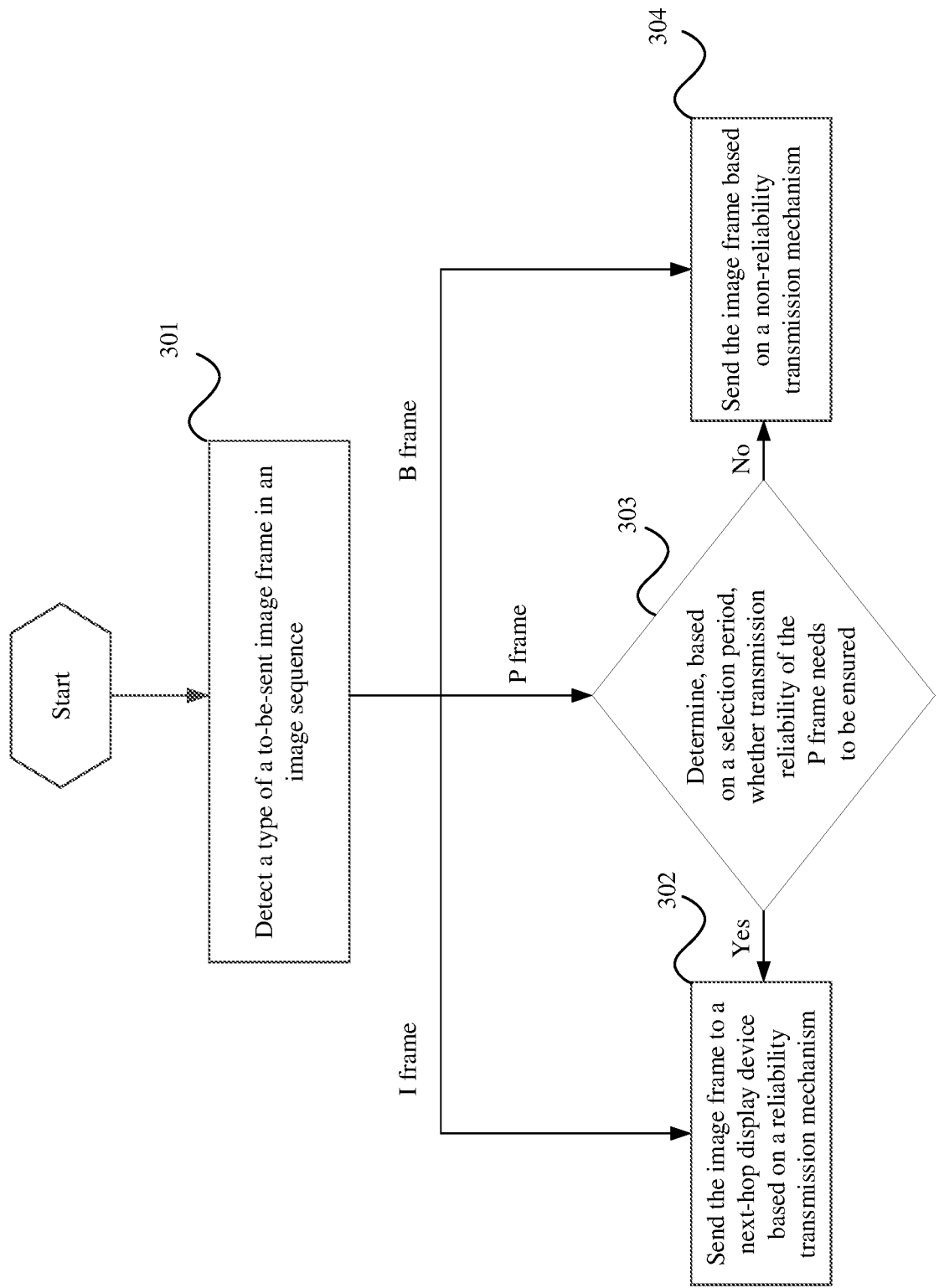
FIG. 6 is a schematic flowchart of a screen projection method according to an embodiment of this application.

Scenario 2:

With reference to FIG. 1 and FIG. 2, FIG. 6 is a schematic flowchart of a screen projection method according to an embodiment of this application. In FIG. 6:

Step 301: Detect a type of a to-be-sent image frame in an image sequence.

For specific details, refer to step 101. Details are not described herein again.

Step 302: Send the image frame to a next-hop display device based on a reliability transmission mechanism.

For specific details, refer to step 102. Details are not described herein again.

Step 303: Determine, based on a selection period, whether transmission reliability of a P frame needs to be ensured.

Optionally, in this application, a controlling device may periodically select a P frame in the image sequence as a high-priority P frame. In other words, the controlling device may select the high-priority P frame based on a preset interval. Optionally, the preset interval (or the selection period) may be set by a quantity of frames, or may be set according to time.

In an example, the selection period (that is, the preset interval) may be counted by the quantity of frames. For example, one high-priority P frame is selected from every three P frames.

In another example, the selection period may alternatively be counted according to time. For example, the period is 3 ms, and sampling is performed every 3 ms. A period triggering moment or a first P frame after the period triggering moment is used as a high-priority P frame. The selection period may be set based on an actual requirement. This is not limited in this application.

Figure 7:
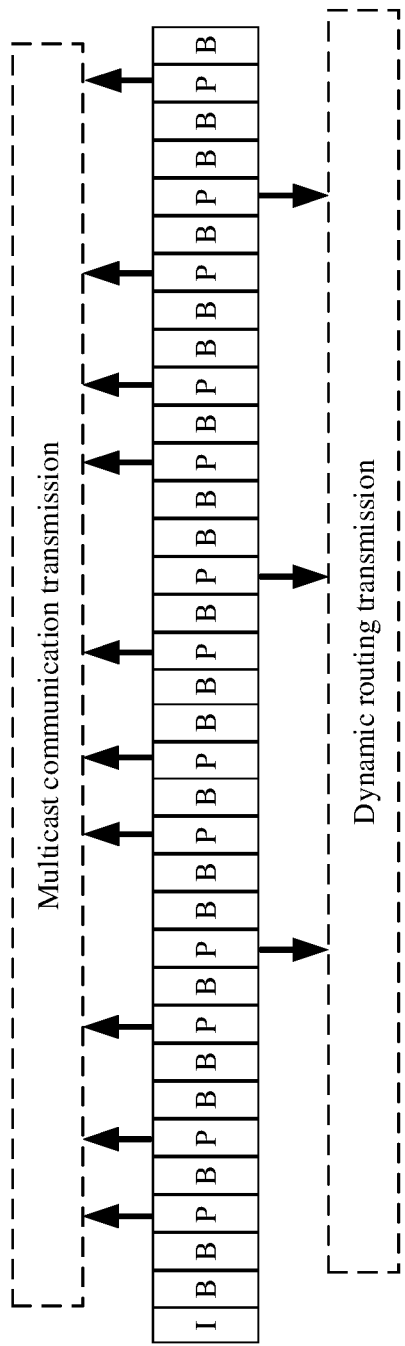
FIG. 7 is a schematic diagram of a method for selecting a high-priority P frame according to an embodiment of this application.

Optionally, if it is determined that transmission reliability of the high-priority P frame needs to be ensured, step 302 is performed. On the contrary, for a low-priority P frame, step 304 is performed. For example, as shown in FIG. 7, the controlling device selects one high-priority P frame from every three low-priority P frames at a preset interval. The high-priority P frame is transmitted based on a dynamic routing transmission mechanism (that is, a reliability transmission mechanism), to improve transmission reliability and video quality, and the low-priority P frame is transmitted based on a multicast transmission mechanism, to reduce channel pressure.

Step 304: Send the image frame based on a non-reliability transmission mechanism.

For specific details, refer to step 104. Details are not described herein again.

Optionally, the controlling device may dynamically adjust an inter-group route based on average video transmission quality of each group; and/or each group leader may dynamically adjust an intra-group route based on video transmission quality of a member in a group. For specific details, refer to related descriptions of step 201 to step 205, FIG. 4, and FIG. 5. Details are not described herein again.

Optionally, in this application, if video transmission quality of a system is relatively poor, in other words, any video transmission quality parameter (a delay or a frame loss ratio) of the system is greater than or equal to a threshold, each display device may forward, between devices by using a wireless connection relationship (namely, a route connection relationship) between display devices, a multicast data packet (a data packet transmitted based on a multicast transmission mechanism) that is from the controlling device and that carries a B frame and/or the P frame (which may be a low-priority P frame). For specific details, refer to Scenario 1. Details are not described herein again.

Figure 8:
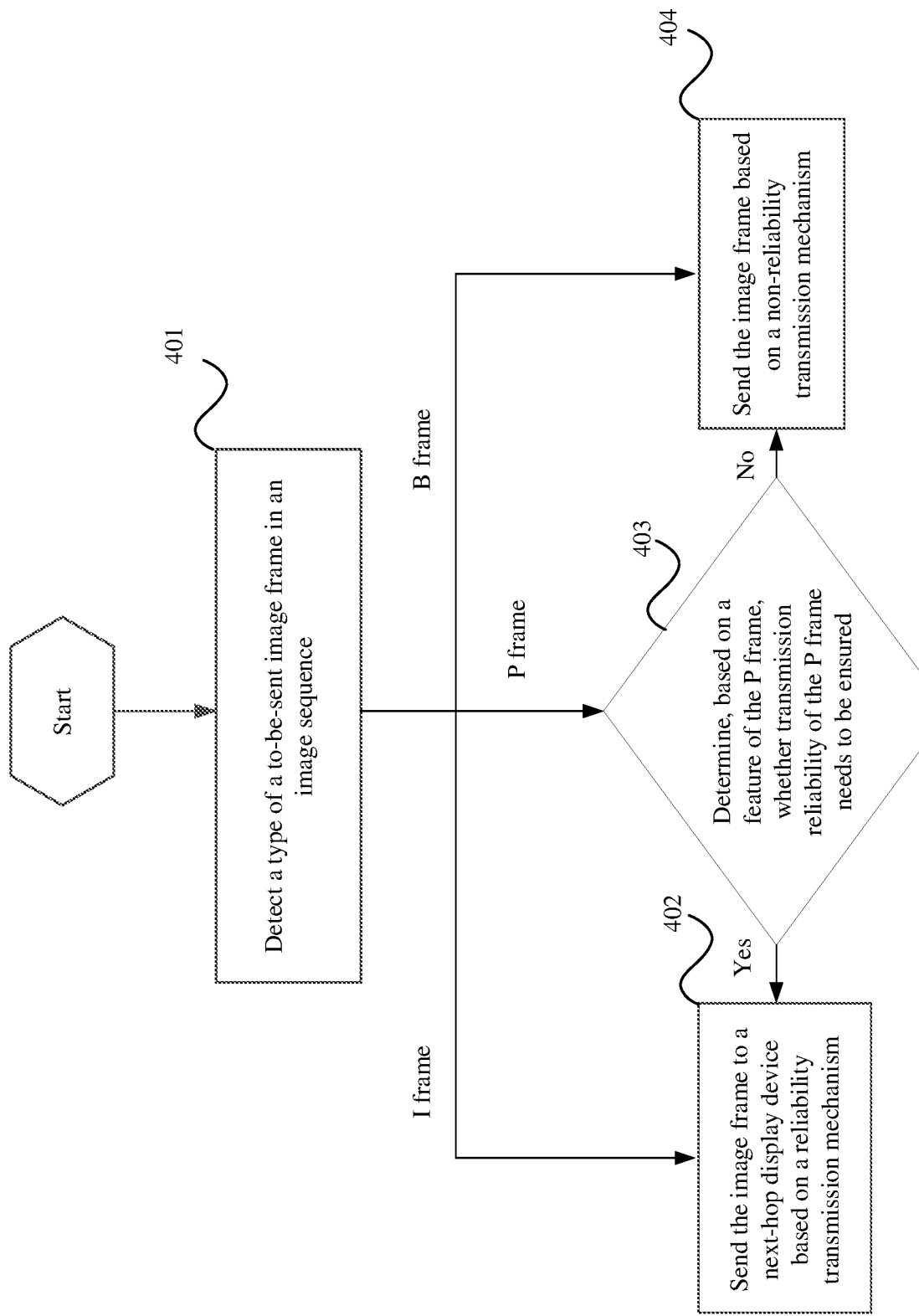
FIG. 8 is a schematic flowchart of an encoding method according to an embodiment of this application.

Scenario 3:

With reference to FIG. 1 and FIG. 2, FIG. 8 is a schematic flowchart of a screen projection method according to an embodiment of this application. In FIG. 8:

Step 401: Detect a type of a to-be-sent image frame in an image sequence.

For specific details, refer to step 101. Details are not described herein again.

Step 402: Send the image frame to a next-hop display device based on a reliability transmission mechanism.

For specific details, refer to step 102. Details are not described herein again.

Step 403: Determine, based on a feature of a P frame, whether transmission reliability of the P frame needs to be ensured.

The controlling device may determine, based on the feature of the P frame, whether the P frame is a high-priority P frame. Optionally, the feature of the frame may be used to describe importance of encoded data of the frame. To be specific, if an inter-frame prediction parameter between the P frame and a previous frame (which may be an I frame, a B frame, or a P frame) and/or a subsequent frame (which may be an I frame, a B frame, or a P frame) is greater than or equal to a threshold (which may be set based on an actual requirement), the P frame may be determined as a high-priority P frame, and step 402 is performed. On the contrary, if the inter-frame prediction parameter is less than the threshold, the P frame is a low-priority P frame, and step 404 is performed.

Step 404: Send the image frame based on a non-reliability transmission mechanism.

For specific details, refer to step 104. Details are not described herein again.

Optionally, the controlling device may dynamically adjust an inter-group route based on average video transmission quality of each group; and/or each group leader may dynamically adjust an intra-group route based on video transmission quality of a member in a group. For specific details, refer to related descriptions of step 201 to step 205, FIG. 4, and FIG. 5. Details are not described herein again.

Optionally, in this application, if video transmission quality of a system is relatively poor, in other words, any video transmission quality parameter (a delay or a frame loss ratio) of the system is greater than or equal to a threshold, each display device may forward, between devices by using a wireless connection relationship (namely, a route connection relationship) between display devices, a multicast data packet (a data packet transmitted based on a multicast transmission mechanism) that is from the controlling device and that carries the B frame and/or the P frame (which may be a low-priority P frame). For specific details, refer to Scenario 1. Details are not described herein again.

It may be understood that, in the foregoing embodiment, before the controlling device initiates screen projection to a plurality of display devices, a plurality of display devices in a display device group may be grouped in advance, and a display device serving as a group leader (another device is a group member) is selected for each group. When there are a small quantity of display devices, the display devices may be not grouped. For example, all the display devices are one group, one display device is a group leader, and another display device is a group member. When the image frame is an I frame, the controlling device sends, to the group leader based on a reliability transmission protocol, a data packet that carries the I frame, and the group leader sends the data packet to the group member based on the reliability transmission protocol. If the image frame is a P frame, the controlling device may further determine, based on a preset condition, whether a data packet that carries the P frame needs to be transmitted based on the reliability transmission protocol. For example, the image frame is a P frame that needs to be transmitted based on the reliability transmission protocol, and may be referred to as a high-priority P frame. The controlling device sends, based on the reliability transmission protocol, a data packet that carries an I frame to the group leader, and the group leader sends the data packet to the group member based on the reliability transmission protocol. If the image frame is a P frame that does not need to be transmitted based on the reliability transmission protocol, the controlling device sends, based on a non-reliability transmission protocol, a data packet that carries the P frame, for example, through multicasting, and all display devices may receive the data packet through multicasting.

The solutions provided in the embodiments of this application are mainly described from a perspective of interaction between network elements. It may be understood that, to implement the foregoing functions, the controlling device includes a hardware structure and/or a software module for performing a corresponding function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, the controlling device may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that module division in the embodiments of this application is an example, and is merely a logical function division. During actual implementation, another division manner may be used.

Figure 9:
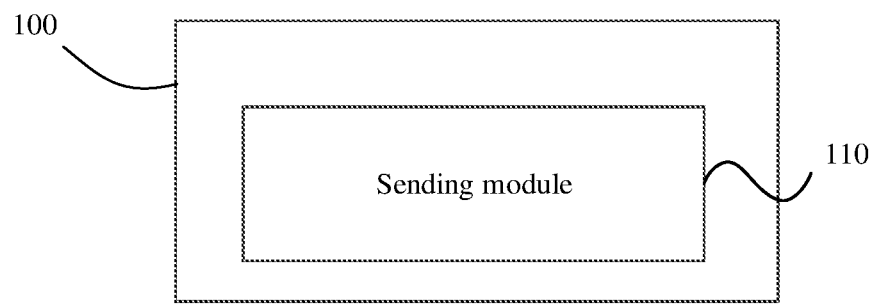
FIG. 9 is a schematic block diagram of a controlling device according to an embodiment of this application.

When each functional module is obtained through division for each function, FIG. 9 is a possible schematic structural diagram of a controlling device 100 involved in the foregoing embodiment. As shown in FIG. 9, the controlling device may include a sending module no. The sending module no may be configured to perform the step "When a to-be-sent image frame is an I frame, send, based on a reliability transmission protocol, a data packet that carries the image frame". The sending module no may be further configured to perform the step "When the to-be-sent image frame is a P frame, and when the P frame is a P frame that meets a first preset condition, send, based on the reliability transmission protocol, the data packet that carries the image frame". The sending module no may be further configured to perform the step "When the P frame is a P frame that does not meet the first preset condition, send, based on a non-reliability transmission protocol, the data packet that carries the image frame". For example, the module may be configured to support the controlling device in performing step 302, step 402, step 304, and step 404 in the foregoing method embodiments.

The sending module no may be further configured to perform the step "When a to-be-sent image frame is an I frame, send, based on a reliability transmission protocol, a data packet that carries the image frame" and the step "When the to-be-sent image frame is a P frame, and when video transmission quality of a screen projection system to which the controlling device belongs meets a second preset condition, send, based on the reliability transmission protocol, the data packet that carries the image frame", and may be further configured to perform the step "When the video transmission quality of the screen projection system to which the controlling device belongs does not meet the second preset condition, send, based on a non-reliability transmission protocol, the data packet that carries the image frame". For example, the module may be configured to support the controlling device in performing step 102 and step 104 in the foregoing method embodiments.

Figure 10:
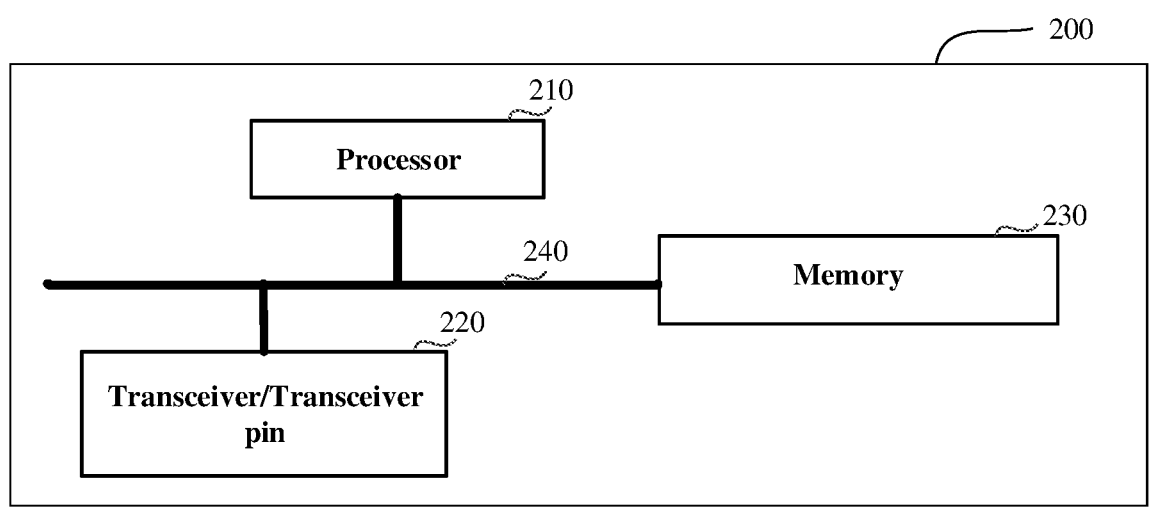
FIG. 10 is a schematic block diagram of a controlling device according to an embodiment of this application.

In another example, FIG. 10 is a schematic block diagram of a controlling device 200 according to an embodiment of this application. The controlling device may include a processor 210 and a transceiver/transceiver pin 220, and optionally, further includes a memory 230. The processor 210 may be configured to perform the steps performed by the controlling device in the methods in the foregoing embodiments, control a receive pin to receive a signal, and control a transmit pin to send a signal.

Components of the controlling device 200 are coupled together by using the bus 240. In addition to a data bus, the bus system 240 further includes a power bus, a control bus, and a status signal bus. However, for clear description, various buses are marked as the bus system 240 in the figure.

Optionally, the memory 230 may be configured to store an instruction in the foregoing method embodiments.

It should be understood that, the foregoing and other management operations and/or functions of the elements in the controlling device 200 in the embodiments of this application are separately used to implement corresponding steps of the foregoing methods. Details are not described herein again for brevity.

All related content of the steps in the foregoing method embodiments may be cited in function descriptions of corresponding functional modules. Details are not described herein again.

Figure 11:
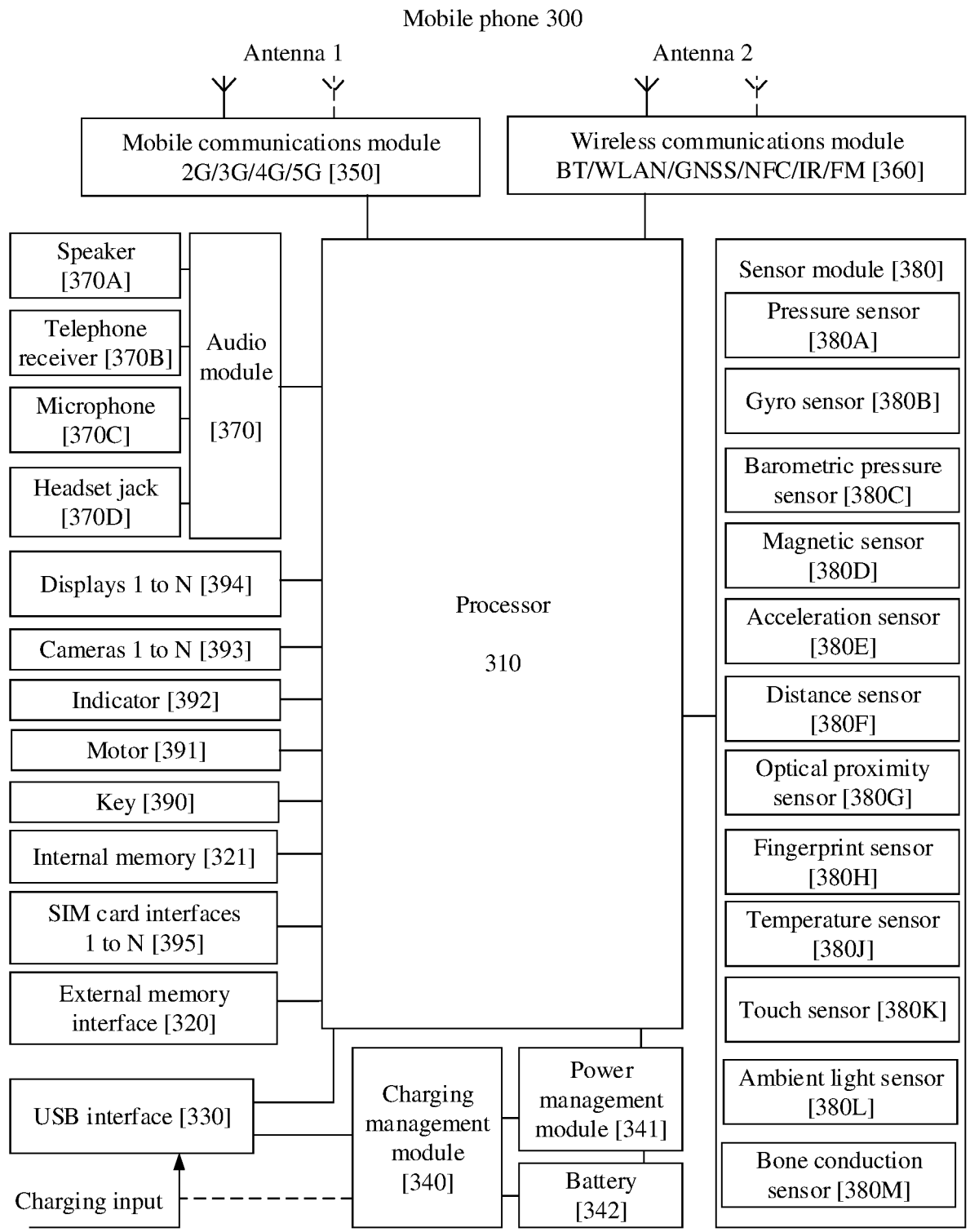
FIG. 11 is a schematic block diagram of a controlling device according to an embodiment of this application.

In another example, FIG. 11 is a schematic block diagram of a controlling device 300 according to an embodiment of this application, and FIG. 11 is a schematic structural diagram of a controlling device when the controlling device is a mobile phone.

As shown in FIG. 11, the mobile phone 300 may include a processor 310, an external memory interface 320, an internal memory 321, a universal serial bus (universal serial bus, USB) port 330, a charging management module 340, a power management unit 341, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a button 390, a motor 391, an indicator 392, a camera 393, a display 394, a subscriber identification module (subscriber identification module, SIM) card interface 395, and the like. The sensor module 380 may include a pressure sensor 380A, a gyro sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It may be understood that an illustrated structure in the embodiments of the present invention does not constitute a specific limitation on the mobile phone 300. In some other embodiments of this application, the mobile phone 300 may include more or fewer components than those shown in the figure, or combine some components, or divide some components, or have different component arrangements. The components shown in the figure may be implemented by using hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural network processing unit, NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data that are/is just used or cyclically used by the processor 310. If the processor 310 needs to use the instructions or the data again, the processor 310 may directly invoke the instructions or the data from the memory. This avoids repeated access and reduces a waiting time of the processor 310. Therefore, system efficiency is improved.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 310 may include a plurality of groups of I2C buses. The processor 310 may be coupled to the touch sensor 380K, a charger, a flash light, the camera 393, and the like through different I2C bus interfaces. For example, the processor 310 may be coupled to the touch sensor 380K through the I2C interface, so that the processor 310 communicates with the touch sensor 380K through the I2C bus interface to implement a touch function of the mobile phone 300.

The I2S interface may be configured to perform audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may transmit an audio signal to the wireless communications module 360 through the I2S interface, to implement a function of answering a call through a Bluetooth headset.

The PCM interface may also be configured to perform audio communication, and sample, quantize, and code an analog signal. In some embodiments, the audio module 370 may be coupled to the wireless communications module 360 through the PCM bus interface. In some embodiments, the audio module 370 may also transmit an audio signal to the wireless communications module 360 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 310 to the wireless communications module 360. For example, the processor 310 communicates with a Bluetooth module in the wireless communications module 360 through the UART interface, to implement a Bluetooth function. In some embodiments, the audio module 370 may transmit an audio signal to the wireless communications module 360 through the UART interface, to implement a function of playing music through a Bluetooth headset.

The MIPI interface may be configured to connect the processor 310 to a peripheral component such as the display 394 or the camera 393. The MIPI interface includes a camera serial interface (camera serial interface, CSI), a display serial interface (display serial interface, DSI), and the like. In some embodiments, the processor 310 communicates with the camera 393 through the CSI interface, to implement a photographing function of the mobile phone 300. The processor 310 communicates with the display 394 through the DSI interface, to implement a display function of the mobile phone 300.

The GPIO interface may be configured by using software. The GPIO interface may be configured as a control signal or a data signal. In some embodiments, the GPIO interface may be configured to connect the processor 310 to the camera 393, the display 394, the wireless communications module 360, the audio module 370, the sensor module 380, and the like. The GPIO interface may alternatively be configured as the I2C interface, the I2S interface, the UART interface, the MIPI interface, or the like.

The USB port 330 is a port that conforms to a USB standard specification, and may be specifically a mini USB port, a micro USB port, a USB T e-C port, or the like. The USB interface 330 may be configured to connect to a charger to charge the mobile phone 300, may be configured to transmit data between the mobile phone 300 and a peripheral device, or may be used to connect to a headset for playing audio through the headset. The port may be further configured to connect to another mobile phone such as an AR device.

It may be understood that an interface connection relationship between the modules shown in this embodiment of the present invention is merely an example for description, and does not constitute a limitation on the structure of the mobile phone 300. In some other embodiments of this application, the mobile phone 300 may alternatively use an interface connection manner different from that in the foregoing embodiment, or use a combination of a plurality of interface connection manners.

The charging management module 340 is configured to receive a charging input from the charger. The charger may be a wireless charger or a wired charger. In some embodiments of wired charging, the charging management module 340 may receive a charging input from the wired charger through the USB port 330. In some embodiments of wireless charging, the charging management module 340 may receive a wireless charging input by using a wireless charging coil of the mobile phone 300. The charging management module 340 supplies power to the mobile phone by using the power management module 341 while charging the battery 342.

The power management module 341 is configured to connect the battery 342 and the charging management module 340 to the processor 310. The power management module 341 receives an input of the battery 342 and/or the charging management module 340, and supplies power to the processor 310, the internal memory 321, the display 394, the camera 393, the wireless communications module 360, and the like. The power management module 341 may be further configured to monitor parameters such as a battery capacity, a battery cycle count, and a battery health status (electric leakage or impedance). In some other embodiments, the power management module 341 may alternatively be disposed in the processor 310. In some other embodiments, the power management module 341 and the charging management module 340 may alternatively be disposed in a same component.

A wireless communication function of the mobile phone 300 may be implemented by using the antenna 1, the antenna 2, the mobile communications module 350, the wireless communications module 360, the modem processor, the baseband processor, and the like.

The antenna 1 and the antenna 2 are configured to transmit and receive electromagnetic wave signals. Each antenna in the mobile phone 300 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 350 may provide a solution, applied to the mobile phone 300, to wireless communication including 2G, 3G, 4G, 5G, and the like. The mobile communications module 350 may include at least one filter, a switch, a power amplifier, a low noise amplifier (low noise amplifier, LNA), and the like. The mobile communications module 350 may receive an electromagnetic wave by using the antenna 1, perform processing such as filtering or amplification on the received electromagnetic wave, and transmit the electromagnetic wave to the modem processor for demodulation. The mobile communications module 350 may further amplify a signal modulated by the modem processor, and convert the signal into an electromagnetic wave for radiation by using the antenna 1. In some embodiments, at least some functional modules in the mobile communications module 350 may be disposed in the processor 310. In some embodiments, at least some functional modules in the mobile communications module 350 and at least some modules in the processor 310 may be disposed in a same component.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transferred to the application processor. The application processor outputs a sound signal through an audio device (which is not limited to the speaker 370A, the receiver 370B, or the like), or displays an image or a video through the display 394. In some embodiments, the modem processor may be an independent device. In some other embodiments, the modem processor may be independent of the processor 310, and is disposed in a same device as the mobile communications module 350 or another functional module.

The wireless communications module 360 may provide a wireless communication solution that is applied to the mobile phone 300 and that include a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology. The wireless communications module 360 may be one or more components integrating at least one communications processor module. The wireless communications module 360 receives an electromagnetic wave by using the antenna 2, performs frequency modulation and filtering processing on the electromagnetic wave signal, and sends a processed signal to the processor 310. The wireless communications module 360 may further receive a to-be-sent signal from the processor 310, perform frequency modulation and amplification on the signal, and convert the signal into an electromagnetic wave for radiation by using the antenna 2.

In some embodiments, the antenna 1 of the mobile phone 300 is coupled to the mobile communications module 350, and the antenna 2 is coupled to the wireless communications module 360, so that the mobile phone 300 can communicate with a network and another device by using a wireless communications technology. The wireless communications technology may include a technology such as global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, GNSS, WLAN, NFC, FM, and/or an IR technology. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS)), and/or a satellite based augmentation system (satellite based augmentation system, SBAS).

The mobile phone 300 implements a display function by using the GPU, the display 394, the application processor, and the like. The GPU is a microprocessor for image processing, and connects the display 394 to the application processor. The GPU is configured to: perform mathematical and geometric calculation, and render an image. The processor 310 may include one or more GPUs that execute program instructions to generate or change display information.

The display 394 is configured to display an image, a video, and the like. The display 394 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like. In some embodiments, the mobile phone 300 may include one or N displays 394, where N is a positive integer greater than 1.

The mobile phone 300 may implement a photographing function by using the ISP, the camera 393, the video codec, the GPU, the display 394, the application processor, and the like.

The ISP is configured to process data fed back by the camera 393. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a shooting scenario. In some embodiments, the ISP may be disposed in the camera 393.

The camera 393 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the mobile phone 300 may include one or N cameras 393, where N is a positive integer greater than 1.

The digital signal processor is configured to process a digital signal, and may process another digital signal in addition to the digital image signal. For example, when the mobile phone 300 selects a frequency, the digital signal processor is configured to perform Fourier transform on frequency energy, and the like.

The video codec is configured to: compress or decompress a digital video. The mobile phone 300 may support one or more video codecs. In this way, the mobile phone 300 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the mobile phone 300, such as image recognition, facial recognition, speech recognition, and text understanding, can be implemented by using the NPU.

The external memory interface 320 may be configured to connect to an external storage card such as a micro SD card, to extend a storage capability of the mobile phone 300. The external storage card communicates with the processor 310 through the external memory interface 320, to implement a data storage function. For example, files such as music and a video are stored in the external storage card.

The internal memory 321 may be configured to store computer-executable program code. The executable program code includes instructions. The internal memory 321 may include a program storage area and a data storage area. The program storage area may store an operating system, an application required by at least one function (for example, a voice play function or an image play function), and the like. The data storage area may store data (such as audio data and an address book) created during use of the mobile phone 300, and the like. In addition, the internal memory 321 may include a high-speed random access memory, and may further include a nonvolatile memory, for example, at least one magnetic disk storage device, a flash memory device, or a universal flash storage (universal flash storage, UFS). The processor 310 runs the instructions stored in the internal memory 321 and/or the instructions stored in the memory disposed in the processor, to execute various function applications of the mobile phone 300 and data processing.

The mobile phone 300 may implement audio functions, for example, music playing and recording, by using the audio module 370, the speaker 370A, the receiver 370B, the microphone 370C, the headset jack 370D, the application processor, and the like.

The audio module 370 is configured to convert digital audio information into an analog audio signal output, and is also configured to convert an analog audio input into a digital audio signal. The audio module 370 may be further configured to: code and decode an audio signal. In some embodiments, the audio module 370 may be disposed in the processor 310, or some functional modules in the audio module 370 are disposed in the processor 310.

The speaker 370A, also referred to as a "horn", is configured to convert an audio electrical signal into a sound signal. The mobile phone 300 may listen to music or answer a hands-free call by using the speaker 370A.

The receiver 370B, also referred to as an "earpiece", is configured to convert an audio electrical signal into a sound signal. When a call is answered or voice information is received by using the mobile phone 300, the receiver 370B may be put close to a human ear to listen to a voice.

The microphone 370C, also referred to as a "mike" or a "microphone", is configured to convert a sound signal into an electrical signal. When making a call or sending a voice message, a user may place the mouth of the user near the microphone 370C to make a sound, to input a sound signal to the microphone 370C. At least one microphone 370C may be disposed in the mobile phone 300. In some other embodiments, two microphones 370C may be disposed in the mobile phone 300, to collect a sound signal and further implement a noise reduction function. In some other embodiments, three, four, or more microphones 370C may alternatively be disposed in the mobile phone 300, to collect a sound signal, reduce noise, further identify a sound source, implement a directional recording function, and the like.

The headset jack 370D is configured to connect to a wired headset. The headset jack 370D may be a USB interface 330, a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 380A is configured to sense a pressure signal, and can convert the pressure signal into an electrical signal. In some embodiments, the pressure sensor 380A may be disposed in the display 394. There are many types of pressure sensors 380A, for example, a resistive pressure sensor, an inductive pressure sensor, and a capacitive pressure sensor. The capacitive pressure sensor may include at least two parallel plates made of conductive materials.

The gyro sensor 380B may be configured to determine a moving posture of the mobile phone 300.

The barometric pressure sensor 380C is configured to measure barometric pressure.

The magnetic sensor 380D includes a Hall sensor.

The acceleration sensor 380E may detect values of acceleration in various directions (usually on three axes) of the mobile phone 300.

The distance sensor 380F is configured to measure a distance.

For example, the proximity sensor 380G may include a light-emitting diode (LED) and an optical detector, for example, a photodiode. The light-emitting diode may be an infrared light-emitting diode.

The ambient light sensor 380L is configured to sense ambient light brightness.

The fingerprint sensor 380H is configured to collect a fingerprint.

The temperature sensor 380J is configured to detect a temperature.

The touch sensor 380K is also referred to as a "touch control device". The touch sensor 380K may be disposed in the display 394. The touch sensor 380K and the display 394 form a touchscreen, which is also referred to as a "touchscreen". The touch sensor 380K is configured to detect a touch operation on or near the touch sensor 380K. The touch sensor may transfer the detected touch operation to the application processor, to determine a type of a touch event. A visual output related to the touch operation may be provided through the display 394. In some other embodiments, the touch sensor 380K may alternatively be disposed on a surface of the mobile phone 300 at a location different from a location of the display 394.

The bone conduction sensor 380M may obtain a vibration signal.

The button 390 includes a power button, a volume button, and the like. The button 390 may be a mechanical button, or may be a touch button. The mobile phone 300 receives key input, and generates key signal input related to a user setting and function control of the mobile phone 300.

The motor 391 may generate a vibration prompt. The motor 391 may be configured to provide an incoming call vibration prompt and a touch vibration feedback.

The indicator 392 may be an indicator light, and may be configured to indicate a charging status and a power change, or may be configured to indicate a message, a missed call, a notification, and the like.

The SIM card interface 395 is configured to connect to a SIM card. The SIM card may be inserted into the SIM card interface 395 or plugged from the SIM card interface 395, to implement contact with or separation from the mobile phone 300. The mobile phone 300 may support one or N SIM card interfaces, where N is a positive integer greater than 1. The SIM card interface 395 may support a nano-SIM card, a micro SIM card, a SIM card, and the like. The mobile phone 300 interacts with a network by using the SIM card, to implement functions such as calling and data communication. In some embodiments, the mobile phone 300 uses an eSIM, namely, an embedded SIM card. The eSIM card may be embedded in the mobile phone 300, and cannot be separated from the mobile phone 300.

It may be understood that the structure shown in the embodiments of the present invention does not constitute a specific limitation on the controlling device 100. In some other embodiments of this application, the controlling device may include more or fewer components than those shown in the figure, or have some components combined, or have some components split, or have a different component arrangement. The components shown in the figure may be implemented by using hardware, software, or a combination of software and hardware.

It may be understood that the display device may alternatively use the foregoing schematic structural diagram of FIG. 11.

Based on a same technical concept, an embodiment of this application further provides a computer-readable storage medium. The computer-readable storage medium stores a computer program, the computer program includes at least one segment of code, and the at least one segment of code may be executed by a network device, to control the network device to implement the foregoing method embodiments.

Based on a same technical concept, an embodiment of this application further provides a computer program. When the computer program is executed by a network device, the computer program is used to implement the foregoing method embodiments.

The program may be all or partially stored in a storage medium that is encapsulated with a processor, or may be all or partially stored in a memory that is not encapsulated with a processor.

Based on a same technical concept, an embodiment of this application further provides a processor. The processor is configured to implement the foregoing method embodiments. The processor may be a chip.

Methods or algorithm steps described in combination with the content disclosed in the embodiments of this application may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device. Certainly, the processor and the storage medium may exist in the network device as discrete components.

A person skilled in the art should be aware that in the foregoing one or more examples, functions described in the embodiments of this application may be implemented by hardware, software, firmware, or any combination thereof. When the functions are implemented by software, these functions may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another place. The storage medium may be any available medium accessible to a general-purpose or dedicated computer.

The foregoing describes the embodiments of this application with reference to the accompanying drawings. However, this application is not limited to the foregoing specific implementations. The foregoing specific implementations are merely examples, and are not limitative. Inspired by this application, a person of ordinary skill in the art may further make many modifications without departing from the purposes of this application and the protection scope of the claims, and all the modifications shall fall within the protection scope of this application.

What is claimed is:

1. A method, comprising:
sending, by a controlling device based on a reliability transmission protocol, in response to a first image frame that is to be sent being an I frame, a first data packet that carries the first image frame;
sending, based on the reliability transmission protocol, in response to a second image frame being a P frame that meets a first preset condition, a second data packet that carries the second image frame; and
sending, based on a non-reliability transmission protocol, in response to a third image frame being a P frame that does not meet the first preset condition, a third data packet that carries the third image frame.

2. The method according to claim 1, wherein the first preset condition comprises at least one of:
the P frame meeting a preset interval in P frames in an image sequence; or
an inter-frame prediction parameter between the P frame and at least one of a previous image frame or a subsequent image frame being greater than or equal to a first threshold.

3. A method, comprising:
sending, by a controlling device based on a reliability transmission protocol, in response to a first image frame that is to be sent being an I frame, a first data packet that carries the first image frame;
sending, based on the reliability transmission protocol, in response to a second image frame being a P frame, and further in response to a video transmission quality of a screen projection system to which the controlling device belongs meeting a second preset condition, a second data packet that carries the second image frame; and
sending, based on a non-reliability transmission protocol, in response to a third image frame being a P frame, and further in response to the video transmission quality of the screen projection system to which the controlling device belongs not meeting the second preset condition, a third data packet that carries the third image frame.

4. The method according to claim 3, wherein the reliability transmission protocol uses a transmission mechanism comprising an acknowledgment; and
wherein the non-reliability transmission protocol uses a multicast transmission mechanism.

5. The method according to claim 4, wherein the reliability transmission protocol is a dynamic routing protocol.

6. The method according to claim 3, wherein the screen projection system comprises two or more screen projection groups, and wherein each screen projection group of the two or more screen projection groups comprises a first display device and at least one second display device; and
    wherein the video transmission quality of the screen projection system is determined based on respective average video transmission quality for a respective screen projection group sent by the first display device in each screen projection group of the two or more screen projection groups, and wherein average video transmission quality for a screen projection group of the two or more screen projection groups is determined by the first display device of the respective screen projection group based on respective video transmission quality sent by each second display device in the respective screen projection group to which the first display device belongs.

7. The method according to claim 6, wherein a quantity of hops between each screen projection group of the two or more screen projection groups and the controlling device is determined based on the respective average video transmission quality for a respective screen projection group in each screen projection group.

8. The method according to claim 6, wherein a quantity of hops between the at least one second display device in each screen projection group two or more screen projection groups and the first display device in the respective screen projection group is determined based on the respective video transmission quality of each second display device of the at least one second display device of the two or more screen projection groups.

9. The method according to claim 8, wherein a quantity of first display devices serving as next-hop nodes of the controlling device is less than or equal to a third threshold; and
    wherein a quantity of second display devices serving as next-hop nodes of the first display device is less than or equal to a fourth threshold.

10. The method according to claim 6, wherein the sending, based on the reliability transmission protocol, the first data packet that carries the first image frame or the second data packet that carries the second image frame comprises:
    sending the first data packet or the second data packet to the first display device serving as a next-hop node of the controlling device.

11. A controlling device, comprising:
at least one processor; and
a non-transitory computer readable memory coupled to the at least one processor and storing program instructions for execution by the processor to cause the controlling device to perform operations including:
sending, based on a reliability transmission protocol, in response to a first image frame that is to be sent being an I frame, a first data packet that carries the first image frame;
sending, based on the reliability transmission protocol, in response to a second image frame being a P frame that meets a first preset condition, a second data packet that carries the second image frame; and
sending, based on a non-reliability transmission protocol, in response to a third image frame being a P frame that does not meet the first preset condition, a third data packet that carries the third image frame.

12. The controlling device according to claim 11, wherein the first preset condition comprises:
the P frame meeting a preset interval in all P frames in an image sequence; or
an inter-frame prediction parameter between the P frame and at least one of a previous image frame or a subsequent image frame is greater than or equal to a first threshold.

13. A controlling device, comprising:
at least one processor; and
a non-transitory computer readable memory coupled to the at least one processor and storing program instructions for execution by the processor to cause the controlling device to perform operations including:
sending, based on a reliability transmission protocol, in response to a first image frame that is to be sent being an I frame, a first data packet that carries the first image frame;
sending, based on the reliability transmission protocol, in response to a second image frame being a P frame, and further in response to a video transmission quality of a screen projection system to which the controlling device belongs meeting a second preset condition, a second data packet that carries the second image frame; and
sending, based on a non-reliability transmission protocol, in response to a third image frame being a P frame, and further in response to the video transmission quality of the screen projection system to which the controlling device belongs not meeting the second preset condition, a third data packet that carries the third image frame.

14. The controlling device according to claim 13, wherein the reliability transmission protocol uses a transmission mechanism comprising an acknowledgment; and
    wherein the non-reliability transmission protocol uses a multicast transmission mechanism.

15. The controlling device according to claim 14, wherein the reliability transmission protocol is a dynamic routing protocol.

16. The controlling device according to claim 13, wherein the screen projection system comprises two or more screen projection groups, and wherein each screen projection group of the two or more screen projection groups comprises a first display device and at least one second display device; and
    wherein the video transmission quality of the screen projection system is determined based on respective average video transmission quality for a respective screen projection group sent by the first display device in each screen projection group of the two or more screen projection groups, and wherein average video transmission quality for a screen projection group of the two or more screen projection groups is determined by the first display device of the respective screen projection group based on respective video transmission quality sent by each second display device in the respective screen projection group to which the first display device belongs.

17. The controlling device according to claim 16, wherein a quantity of hops between each screen projection group of the two or more screen projection groups and the controlling device is determined based on the respective average video transmission quality for a respective screen projection group in each screen projection group.

18. The controlling device according to claim 16, wherein a quantity of hops between the at least one second display device in each screen projection group two or more screen projection groups and the first display device in the respective screen projection group is determined based on the respective video transmission quality of each second display device of the at least one second display device of the two or more screen projection groups.

19. The controlling device according to claim 16, wherein the sending, based on the reliability transmission protocol, the first data packet that carries the first image frame or the second data packet that carries the second image frame comprises:
 sending the first data packet or the second data packet to the first display device serving as a next-hop node of the controlling device.

* * * * *